US010192553B1

(12) United States Patent
Chenier et al.

(10) Patent No.: US 10,192,553 B1
(45) Date of Patent: Jan. 29, 2019

(54) INITIATING DEVICE SPEECH ACTIVITY MONITORING FOR COMMUNICATION SESSIONS

(71) Applicant: Amazon Technologies, Inc., Seattle, WA (US)

(72) Inventors: Mario Chenier, Woodinville, WA (US); Tony Roy Hardie, Seattle, WA (US); Nawdesh Uppal, Mississauga (CA); Brian Oliver, Seattle, WA (US); Ran Mokady, Seattle, WA (US)

(73) Assignee: Amazon Technologes, Inc., Seattle, WA (US)

( * ) Notice: Subject to any disclaimer, the term of this patent is extended or adjusted under 35 U.S.C. 154(b) by 0 days.

(21) Appl. No.: 15/385,410

(22) Filed: Dec. 20, 2016

(51) Int. Cl.
*G10L 15/22* (2006.01)
*H04L 29/08* (2006.01)
*G10L 17/06* (2013.01)
*G10L 25/21* (2013.01)
*G10L 25/84* (2013.01)
*G10L 15/26* (2006.01)
*G06K 9/00* (2006.01)

(52) U.S. Cl.
CPC .......... *G10L 15/22* (2013.01); *G06K 9/00362* (2013.01); *G10L 15/26* (2013.01); *G10L 17/06* (2013.01); *G10L 25/21* (2013.01); *G10L 25/84* (2013.01); *H04L 67/141* (2013.01); *H04L 67/306* (2013.01); *G10L 2015/223* (2013.01)

(58) Field of Classification Search
CPC ................................ G10L 15/06; G10L 15/22
See application file for complete search history.

(56) References Cited

U.S. PATENT DOCUMENTS

| | | | | |
|---|---|---|---|---|
| 7,809,569 B2* | 10/2010 | Attwater | ................. | G10L 15/08 704/231 |
| 8,031,849 B1* | 10/2011 | Apple | ................... | H04M 15/08 379/114.03 |
| 8,781,841 B1* | 7/2014 | Wang | ...................... | H04M 3/56 379/205.01 |
| 9,531,998 B1* | 12/2016 | Farrell | .................. | A63F 13/352 3/352 |
| 9,767,828 B1* | 9/2017 | Velusamy | ................ | H04B 3/23 |
| 2002/0075856 A1* | 6/2002 | LeBlanc | ................. | G10L 25/78 370/352 |
| 2003/0014488 A1* | 1/2003 | Dalal | ..................... | H04L 29/06 709/204 |

(Continued)

*Primary Examiner* — Douglas Godbold
(74) *Attorney, Agent, or Firm* — Pierce Atwood LLP

(57) ABSTRACT

Methods and devices for causing a communications session between a first device and a second device to end based on lack of speech activity are described herein. In some embodiments, a communications between a first device and a second device may be initiated by the first device, where a first user account associated with the first device is authorized to initiate communications session with the second device by a second user account. After the communications session is started, audio data is received by a speech activity detection system, which determines whether the audio data represents speech or non-speech. If, after the communications session begins, non-speech is detected by the first device for more than a predefined amount of time, then the communications session is caused to end so that the first device is not capable of receiving video and/or audio associated with the second device.

20 Claims, 11 Drawing Sheets

(56) References Cited

U.S. PATENT DOCUMENTS

| | | | |
|---|---|---|---|
| 2005/0136952 A1* | 6/2005 | Zabawskyj | H04L 51/04 455/466 |
| 2006/0073806 A1* | 4/2006 | Jenkins | G08B 25/016 455/404.1 |
| 2007/0130260 A1* | 6/2007 | Weintraub | H04L 29/06027 709/204 |
| 2007/0180122 A1* | 8/2007 | Barrett | H04L 67/14 709/227 |
| 2008/0242231 A1* | 10/2008 | Gray | H04M 1/72563 455/66.1 |
| 2010/0020941 A1* | 1/2010 | Walker, III | H04M 3/42059 379/38 |
| 2010/0054429 A1* | 3/2010 | Tonini | G06Q 20/10 379/88.02 |
| 2010/0173585 A1* | 7/2010 | Button | H04L 12/282 455/41.3 |
| 2010/0216436 A1* | 8/2010 | Wijayanathan | H04W 52/0232 455/414.1 |
| 2010/0313078 A1* | 12/2010 | Burckart | H04L 67/14 714/48 |
| 2011/0150202 A1* | 6/2011 | Cheng | H04M 3/432 379/207.03 |
| 2012/0020393 A1* | 1/2012 | Patil | H04W 76/068 375/222 |
| 2012/0276309 A1* | 11/2012 | Failing | G06F 17/50 428/34.1 |
| 2013/0189963 A1* | 7/2013 | Epp | H04M 1/64 455/414.1 |
| 2015/0143227 A1* | 5/2015 | Jia | G06F 17/2247 715/234 |
| 2015/0148012 A1* | 5/2015 | Bhide | H04W 76/06 455/414.1 |
| 2015/0249718 A1* | 9/2015 | Huybregts | G06K 9/00228 709/202 |
| 2015/0249737 A1* | 9/2015 | Spievak | H04M 3/2281 379/189 |
| 2016/0284349 A1* | 9/2016 | Ravindran | G10L 15/20 |
| 2017/0061970 A1* | 3/2017 | Escott | G10L 17/20 |
| 2017/0104958 A1* | 4/2017 | Farrell | H04N 7/141 |
| 2017/0194004 A1* | 7/2017 | Lousky | G10L 17/04 |
| 2017/0235357 A1* | 8/2017 | Leung | G06F 1/3212 713/310 |
| 2017/0302794 A1* | 10/2017 | Spievak | H04M 3/2281 |

\* cited by examiner

INITIATING DEVICE SPEECH ACTIVITY MONITORING FOR COMMUNICATION SESSIONS

BACKGROUND

Two or more devices may be capable of communicating audio and/or video with one another. For audio communications, sounds captured by each devices' microphone(s) may be may be received by the other device(s). For video communications, video as well as audio captured by each device(s) camera(s) and/or microphone(s) may be received by the other device(s).

DETAILED DESCRIPTION

Figure 1:
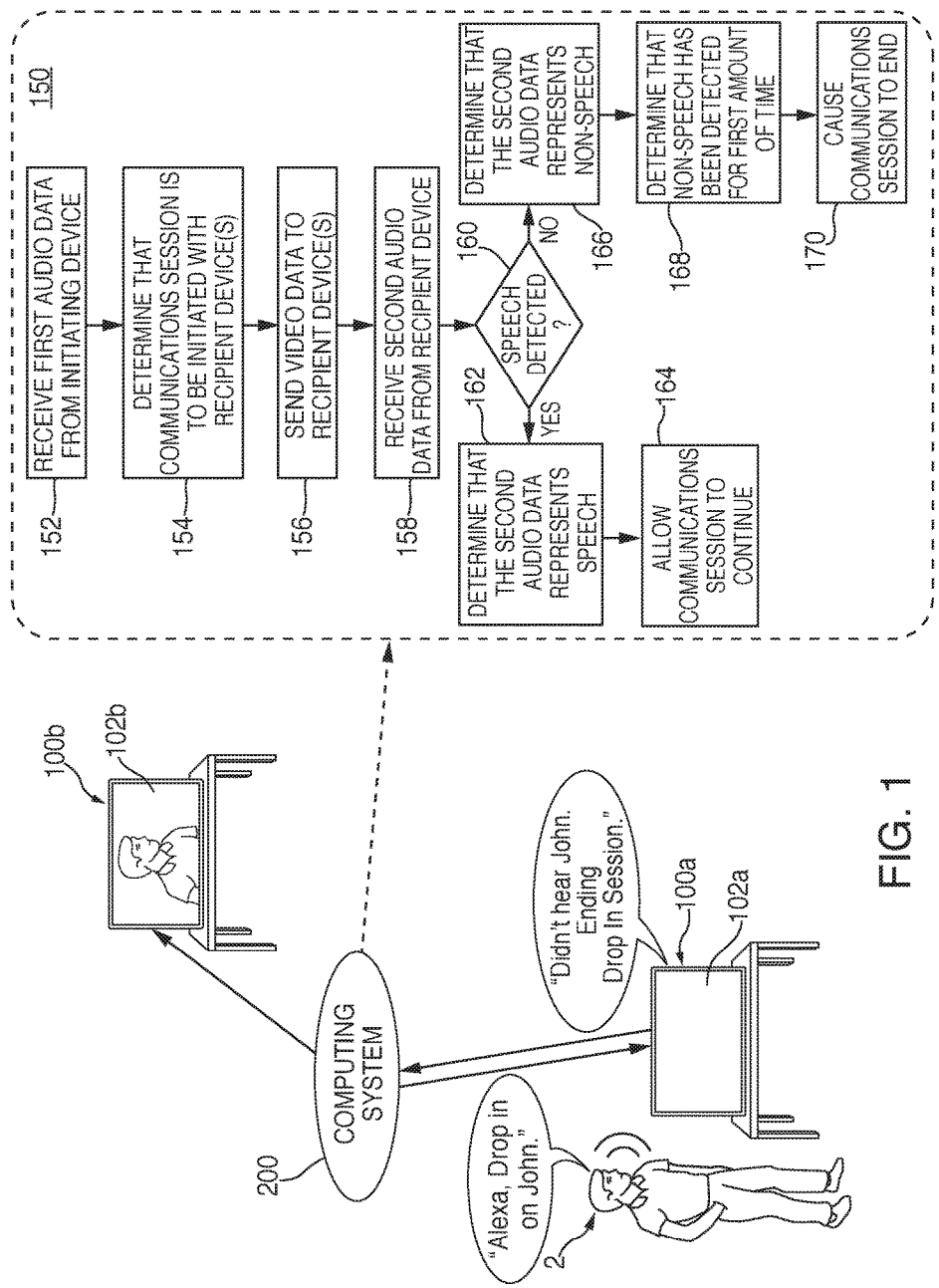
FIG. 1 is an illustrative diagram of an exemplary system for causing a communications session to end in response to a recipient device detecting silence, in accordance with various embodiments.

The present disclosure, as set forth below, is generally directed to various embodiments of methods and systems for ending communications between devices based, at least in part, on an absence of presence data. Presence data, in one embodiment, may correspond to any characteristic that may indicate an individual, or individuals, presence. For instance, lack of speech activity may indicate that an individual is not present, or does not want to communicate with another individual. Speech activity, in some embodiments, may be monitored for an initiating device—a device that initiates a communications session—as well as, or alternatively, for a recipient device.

In a non-limiting, exemplary embodiment, a first individual operating a first device may communicate with a second individual operating a second device using one or more types of communication such as, and without limitation, audio communications, video communications, and/or textual communications. The specific type of communication that one may use to communicate with another may depend, for instance, on a type of device that the initiator operates, as well as a type of device that the receiver operates. For example, an individual may be capable of conducting video communications with another individual so long as both individuals have devices capable of facilitating video communications (e.g., devices including cameras and screens).

In some embodiments, an individual may authorize certain contacts so that those contacts have permission to initiate and establish a communications session between the individual's electronic device and that contact's electronic device. By granting such permissions, the authorized contacts may be able to establish a communications session with the individual without requiring that the individual "accept," or otherwise approve, the communications session. For example, an individual may authorize a first contact such that the first contact is able to establish a communications session with the individual. In response to the first contact speaking a communications session initiation utterance, or pressing a button to start a communications session, a communications session between the first contact's device and the individual's device may be established, and the two devices may be capable of sending/receiving audio and/or video communications to/from one another. By granting the first contact permission to establish the communication session, the individual would not be required to provide explicit approval prior to the communications session starting.

In one embodiments, contacts may be allowed to initiate and establish communications sessions with others that are indicates as being present, or otherwise able participate in a communications session. For example, the initiating device may receive indications of which contacts of there are currently located proximate to their corresponding recipient device. In this particular scenario, an individual may request to establish a communications session with that contact's device. Contacts that have been authorized to initiate and establish communications sessions, however, may not be able to know beforehand whether or not someone is available to participate in a communications session. Furthermore, contacts may not be aware of each instance that they are being targeted to participate in a communications session. For example, if the contact does not hear an indication that an individual is attempting to establish a communications session with them, then the contact may unknowingly be entered into the communications session.

By providing contacts with the authorization to initiate such communications sessions, these contacts may receive the ability to automatically connect with that authorizer's device, thereby allowing that contact to hear and/or see the goings-on within the authorizing individual's household. For example, a first individual may authorize a second individual to be able to initiate a communications session between their corresponding devices. The second individual, in this scenario, will not need to receive the first individual's approval to start a communications session. Therefore, in some embodiments, upon establishing the communications session, may be provided with "live" video and/or audio received by the first individual's communications device. This may present a problem in that the first individual may be in a compromised scenario and/or generally unaware that the second individual is capable of seeing and/or hearing the goings-on within their household (or within viewing range of that particular device). For example, even if the first individual is determined to be "present" to their device, that individual may have their back turned to the device, or may have headphones on, and therefore may be unaware of the second individual initiating the communications session. In some embodiments, however, the individual may not be home and, if presence information is not needed to initiate a communications session, may therefore enable another individual to initiate a communications session with a device of an empty home.

Various techniques, as described herein, may be employed to prevent such issues inherently stemming from an individual authorizing certain contacts with the ability to establish communications sessions with one or more of their electronic devices. In one non-limiting embodiment, presence may be determined using speech activity detection techniques. For example, speech being detected may indicate an individual's presence, whereas a lack or absence of speech may indicate that an individual is not present. Speech activity detection may be employed for audio data received by the initiating device and/or a recipient device. In one embodiment, the audio data may be analyzed using speech activity detection techniques to determine whether or not an individual—either on the initiating device side and/or the recipient device side—speaks after the communications session has been established.

In one embodiment, the initiating individual may speak, to an initiating device, a first utterance (e.g., "Alexa, drop in on Mom") to start a communications session with a particular recipient's device. Audio data representing the first utterance may be received by a speech-processing system, which may determine that an intent of the first utterance is for a communications session to be established between the initiating device and a recipient device associated with a contact identified from the first utterance (e.g., a device associated with a contact named "Mom"). The speech-processing system may then indicate to a communications system that the initiating device, which is authorized to communicate with the recipient device, that a communications session between the two devices is to be established such that audio and/or video communications may be sent/received to/from both devices. In some embodiments, in order for the initiating device to initiate a communications session with a recipient device, the recipient device may first need to detect an individual's presence. For example, if an individual is located nearby the recipient device, then the initiating device may receive a notification (e.g., a notification displayed on the initiating device's display screen) indicating that someone is currently present near the recipient device, and therefore a communications session may be established.

After the communications session is established, presence data for the initiating device may be monitored to determine whether presence is detected. In one embodiment, a communications system may monitor presence data to determine whether presence is detected by the initiating device. For example, detection of speech stemming from the initiating device may indicate that presence is detected by the initiating device. For example, data indicating that sounds were received by one or more microphones associated with the initiating device may be received by the communications system. The sounds may correspond to speech (e.g., an individual speaking proximate the initiating device) or non-speech (e.g., silence, noise, speech unassociated with a user account of the initiating device, etc.). If the sounds are determined to correspond to speech, for example, then the communications session may continue, as the initiating individual is likely speaking, and the recipient individual will likely be aware, if not already, of the speech. If the sounds are determined to correspond to non-speech, such as silence or noise, then the communications session may end, thereby preventing the recipient device from unknowingly providing a live feed into their home. Persons of ordinary skill in the art will recognize that, in some embodiments, the speech activity detection may be performed locally on the initiating device, or remotely on a separate communications system including a speech activity detection system. For example, an initiating device and/or recipient device may include a communications system, which may be able to determine, using presence data obtained by the initiating device and/or recipient device, whether speech has been detected.

In one embodiment, audio data that is received by the speech activity detection system may be of any suitable temporal duration such that an analysis of speech activity may be performed. For example, the audio data may represent sounds having a temporal duration of a few seconds. At a first time, a first determination may be made as to whether or not the sounds represent speech, and then at a second time, a second determination may be made as to whether or not the sounds represent speech. If the sounds do not represent speech at both the first and second times, then the sounds may correspond to non-speech (e.g., noise or silence). Additional determinations may be made at additional times such that a full analysis of the sounds may be performed to determine whether or not the sounds correspond to speech, and the aforementioned is merely exemplary. For example, determinations of whether or not audio data represents speech may be performed at any suitable temporal intervals, such as every few milliseconds.

In some embodiments, presence data, or an absence of presence data, associated with the initiating device and/or the recipient device may also be employed to determine whether or not the communications session should end. For example, a recipient device may monitor presence data. Presence data, in one embodiment, may indicate a likelihood of an individual is present proximate to the recipient device. For example, presence data may correspond to speech data, image data, and/or received signal strength data. A presence tracking system may send the presence information to the communications system, which may harness that information for ending the communications session, or allowing the communications system to continue. For instance, if the presence data indicates that an individual is located proximate to the recipient device during a communications session, then the communications system may extend an amount of time with which presence data received by the initiating device is monitored. For example, if an individual is located nearby their recipient device, then the communications system may determine whether or not speech has been received by the recipient device. In some embodiments, the presence information may be used to prevent a communications session from beginning. For example, if the presence information indicates that no individuals are present proximate to the recipient device, then the communications system may end the communications session, as no one is likely near the recipient device. As another example, presence information associated with the initiating device may be monitored to determine whether an individual is present proximate to the initiating device. If this presence information indicates that no one is present, then the communications system may cause the communications session to end. Furthermore, a lack, or absence, of presence data, in general, may indicate that the communications session should end. Presence information, as described herein, may correspond to speech information (e.g., speech data), beaconing data (e.g., RSSI levels between a mobile device of an individual and an initiating/requesting device), infrared sensing, computer vision sensing (e.g., detection of a human body part within an image or video), and the like.

In some embodiments, the communications system, in response to the communications session being established, may instruct an individual associated with the initiating device to speak a particular utterance in order to confirm that they are indeed attempting to start, and be present for, the communications session. For example, after establishing the communications session with a recipient device, the initiating individual may be instructed to speak a first utterance. This may allow any individuals associated with the recipient device to be aware of the initiating device attempting to start a communications session therewith. In some embodiments, the communications system may instruct a speech-processing system to determine whether or not the correct utterance was spoken. For example, the communications system may instruct the initiating device to send audio data representing sounds to a speech-processing system, where the sounds are captured after an instruction to speak a particular phrase are provided to the initiating device. The speech-processing system may then perform various speech-processing functionalities to the audio data (e.g., speech-to-text processing, natural language understanding processing, etc.) in order to determine whether or not the spoken utterance matches the particular phrase. If the utterance does match the phrase, than the communications system may allow the communications session to proceed, whereas if the utterance is determined to not match the phrase, then the communications system may cause the communications session to end.

In a non-limiting embodiment, presence data, such as speech activity, may be monitored for a recipient device in response to an initiating device establishing a communications session with the recipient device. For example, an individual, who may be authorized to establish such communications sessions with a particular individual associated with the recipient device, may speak an utterance or press a button to cause a communications session between the initiating device and the recipient device to be established. In some embodiments, the recipient device may be configured such that communications sessions may only be established if the recipient device determines that an individual is currently located proximate to the recipient device.

In response to establishing the communications session, the recipient device may begin receiving (and outputting) video and/or audio communications from the initiating device. Furthermore, in some embodiments, presence data obtained by the recipient device after the communications session is established may be monitored to determine whether presence is detected. In some embodiments, a communications system may monitor presence data to determine whether presence is detected by the recipient device. For example, detection of speech stemming from the recipient device after the communications session is established may indicated that presence is detected by the recipient device. For example, data indicating sounds received by one or more microphones associated with the recipient device may be received by the communications system, and the sounds may correspond to speech or non-speech. If the sounds are determined to correspond to speech, for instance, then the communications session may continue, as the recipient individual is likely speaking and aware of the communications session. If the sounds are determined to correspond to non-speech, then the communications session may end. Persons of ordinary skill in the art will recognize that speech activity detection may be performed locally by the recipient device, or on a separate communications system including a speech activity detection system. In some embodiments, the sounds received by the recipient device during a first temporal duration after the communications session begins may be sent to the communications system from the recipient device. Audio data may not yet be sent to the initiating device from the recipient device, and instead a determination may be made as to whether or not the sounds correspond to speech. A speech activity detection system may receive the audio data and may determine whether the sounds correspond to speech or non-speech. If the speech activity detection system determines that the sounds correspond to speech then the communications system may allow the communications session to continue. If, however, the speech activity detection system determines that the sounds correspond to non-speech, then the communications system may cause the communications session to end.

In some embodiments, determining whether the sounds correct to speech or non-speech may include performing speaker identification techniques to the audio data to determine whether the sounds correspond to a known voice, such as a voice of an individual associated with the recipient device. As mentioned previously, the speech activity detection system may determine whether the sounds correspond to speech or non-speech. Non-speech may correspond to silence, for example, which may be detected by a lack of sounds exceeding a certain predefined volume threshold. Non-speech may also correspond to noise, which may be sounds that may exceed the predefined volume threshold, but either do so infrequently or without any sensible pattern that are associated with spoken words. However, non-speech may also correspond to speech that originates from a non-human source, such as a television, radio, speaker, or other audio output device. As an illustrative example, a radio may be currently playing in the vicinity of a recipient device when a communications session is established. In this particular scenario, the speech activity detection system may determine that audio data representing sounds received by the recipient device may correspond to speech, as it may "hear" the speech output by the radio. However, this speech is not associated with an individual interacting with the recipient device. The speaker identification system may analyze the audio data to determine whether the speech corresponds to voice biometric information associated with a user account linked to the recipient device. If the speaker identification system indicates that the audio data is not related to that voice biometric information, then this may indicate to the communications system that the audio data does not represent speech but in fact represents non-speech (e.g., speech originating from a non-human source). Therefore, the communications system may cause the communications session to end, as no individual may be communicating with the recipient device as part of the communications session.

In a non-limiting embodiment, a communications session that has been established between two or more devices may be caused to end in response to determining that an absence of presence data has been received by each of the devices. In one embodiment, during a communications session between a first device and a second device, presence data may be received from the first device and from the second device. For example, the presence data may indicate that sounds received by the first device and the second device both correspond to non-speech. In some embodiments, an absence of the presence data occurring for more than a predefined threshold amount of time may indicate that the communications session should end. In this particular scenario, the communications session may be caused to end based on the absence of presence data being detected by both the first device and the second device, and based on the absence occurring for more than the predefined threshold amount of time.

In some embodiments, as the communications session progresses, the communications system may continually monitor presence data received by one or more of the initiating and/or recipient device. If the presence data corresponds to audio data, for instance, a speech activity detection system may be employed to determine whether the audio data represents speech or non-speech. If non-speech is detected from the recipient device, the initiating device, or both, for longer than a predefined amount of time, then the communications system may cause the communications session to end.

In some embodiments, presence data being received may allow a communications session to continue. For example, if non-speech is detected by one of the devices of the communications session, but that same device detects other presence data (e.g., image data representing at least a portion of a human body part), then the communications session may be allowed to continue. However, if an absence of presence data is detected (e.g., an indication that no individuals have been present proximate to that device for longer than a predefined amount of time), then the communications session may be caused to end.

To initiate a communications session, an individual may, in one embodiment, speak an utterance. Audio data representing the utterance may be sent to the computing system, and in particular a speech-processing system of the computing system, in order to determine an intent of the utterance. For example, an individual may speak an utterance, "Alexa, start a communications session with Mom," or "Drop in on Mom." The speech-processing system may then communicate with a communications system to establish a communications channel for facilitating a communications session with a particular device associated with the identified/named contact (e.g., "Mom").

Spoken voice commands, in some embodiments, may be prefaced by a wakeword, which may also be referred to as a trigger expression, wake expression, or activation word. In response to detecting the wakeword being uttered, a voice activated electronic device may be configured to detect and interpret any words that subsequently follow the detected wakeword as actionable inputs or commands. In some embodiments, the voice activated electronic device may be activated by a phrase or grouping of words, which the voice activated device may also be configured to detect. The voice activated device, therefore, may also be able to detect and interpret any words subsequently following that phrase or grouping of words.

As used herein, the term "wakeword" may correspond to a "keyword" or "key phrase," an "activation word" or "activation words," or a "trigger," "trigger word," or "trigger expression." One exemplary wakeword may be a name, such as the name, "Alexa," however persons of ordinary skill in the art will recognize that the any word (e.g., "Amazon"), or series of words (e.g., "Wake Up" or "Hello, Alexa") may alternatively be used as the wakeword. Furthermore, the wakeword may be set or programmed by an individual operating a voice activated electronic device, and in some embodiments more than one wakeword (e.g., two or more different wakewords) may be available to activate a voice activated electronic device. In yet another embodiment, the trigger that is used to activate a voice activated device may be any series of temporally related sounds.

As used herein, the term "utterance" may correspond to a spoken word, statement, or sound. In some embodiments, an utterance may include the wakeword followed by an invocation, such as a request, question, or command. In this particular instance, the utterance may begin with the wakeword being spoken, and may end when a last word, phoneme, or sound is spoken. For example, an utterance may correspond to the question, "Alexa—What is the weather currently like?" As another example, an utterance may be, "Alexa—Play my workout music." Further still, an utterance, which need not include the wakeword, may be, "Turn up the volume" or "Call mom."

A sound controlled electronic device may monitor audio input data detected within its local environment using one or more microphones, transducers, or other audio input devices located on, or in communication with, the sound controlled electronic device. In particular, a voice activated electronic device may correspond to one type of sound controlled electronic device that is capable of being activated in response to a wakeword being uttered. In response to determining that a wakeword has been uttered, the voice activated electronic device may, in some embodiments, send the audio data representing a spoken utterance subsequently following the wakeword to a speech-processing system for processing and analyzing the audio data. The speech-processing system may then generate and send a response to the voice activated electronic device, as well as, or alternatively, communicate with one or more additional systems for obtaining content to be rendered by the voice activated electronic device, and/or may cause one or more additional electronic devices to output content and/or perform a particular action (e.g., turn on a light, preheat an oven, etc.). Additionally, the voice activated electronic device may store one or more wakewords within its local memory. If a determination is made that audio data received from the audio input devices (e.g., microphones) matches the wakeword, the voice activated electronic device may begin sending audio data representing some or all of the audio captured by the voice activated electronic device to the speech-processing system.

In some embodiments, the trigger may be a non-verbal sound. For example, the sound of a door opening, an alarm going off, glass breaking, a telephone ringing, or any other sound may alternatively be used to activate a sound controlled electronic device. In this particular scenario, detection of a non-verbal sound may occur in a substantially similar manner as that of a verbal wakeword for a voice activated electronic device. For example, the sound of a door opening, when detected, may activate a sound activated electronic device, which in turn may activate a burglar alarm.

In some embodiments, the sound controlled electronic device, as mentioned previously, may also correspond to a manually activated electronic device. A manually activated electronic device, as described herein, may correspond to a device that is capable of being activated in response to a manual input from an individual (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed by an individual.

FIG. 1 is an illustrative diagram of an exemplary system for causing a communications session to end in response to a recipient device detecting silence, in accordance with various embodiments. In a non-limiting, illustrative embodiment, an individual 2 may speak an utterance 4, with the intent of initiating and establishing a communications session with another individual. For example, utterance 4 may correspond to "Alexa, Drop in on John." In this example, the name "Alexa" may correspond to a wakeword for a voice activated electronic device 100a, the term "drop in on" may correspond to an invocation phrase to initiate a communications session with another device, and the name "John" may correspond to a name of a contact associated with a user account for individual 2. Upon determining that utterance 4 includes a wakeword, voice activated electronic device 100a may begin packaging and sending audio data representing utterance 4 to computing system 200 (which is described in greater detail below with reference to FIG. 2).

Computing system 200 may include a speech-processing system that, in some embodiments, is configured to determine an intent of a spoken utterance using the received audio data, and generate a response to the utterance and/or cause one or more actions to be performed. For instance, upon receiving audio data representing utterance 4, the speech-processing system may generate text data representing the audio data by performing speech-to-text processing to the audio data, and may determine an intent of the utterance from the text data by performing natural language understanding processing.

In the illustrative embodiment, individual 2 may seek to establish a communications session with a particular contact (e.g., a contact named "John") using voice activated electronic device 100a. In one embodiment, individual 2, and in particular a user account associated with individual 2, may be authorized by another individual such that individual 2 may be allowed to establish a communications session with the other individual without requiring the other individual to approve, or otherwise permit, the communications session. For example, the contact "John" may pre-authorize a user account associated with individual 2 such that individual 2 may begin communicating with one or more devices associated with "John" upon invoking the communications session function using their electronic device. In particular, upon receiving audio data representing utterance 4 from voice activated electronic device 100a, computing system 200 may determine a device identifier associated with voice activated electronic device 100a, determine a user account associated with that device identifier, and, based on the determined target (e.g., "John"), may determine whether the user account is authorized to establish a communications session with that contact.

If computing system 200 determines that individual 2, and in particular the user account associated with voice activated electronic device 100a, is permitted to initiate a communications session with the desired contact, computing system 200 may begin sending, using an associated communications system of computing device 200, video and/or audio communications to the contact's corresponding electronic device. For example, computing system 200 may determine that the contact "John" is associated with a second voice activated electronic device 100b. Computing system 200 may, therefore, access a communications system for establishing a communications channel for voice activated electronic devices 100a and 100b, and sending video communications and/or audio communications captured by voice activated electronic device 100a to voice activated electronic device 100b. In some embodiments, the communications system may cause the receiving device, voice activated electronic device 100b, to substantially immediately begin rendering the video/audio communications received from voice activated electronic device 100a. For example, the communications system of computing system 200 may cause video communication 102b to be displayed by voice activated electronic device 100b.

In some embodiments, individual 2 may be able to initiate a communications session with the named contact's device when presence data received by the named contact's device determines presence proximate to the named contact's device. For example, if an individual is located nearby voice activated electronic device 100b, presence data indicating that information may be provided to voice activated electronic device 100a. For instance, an icon may be displayed on a display screen of voice activated electronic device 100a that indicates presence currently detected for voice activated electronic device 100b, and therefore a communications session may be established with voice activated electronic device 100b. However, persons of ordinary skill in the art will recognize that presence being detected by a recipient device prior to allowing an individual to establish a communications session therewith is merely exemplary.

Video communications 102b may, be displayed by the recipient device (e.g., voice activated electronic device 100b) substantially immediately, thereby providing individual 2, and the other individual associated with the recipient device, with the feeling as if individual 2 is "dropping by." As individual 2 has been pre-authorized to establish communications sessions with the contact associated with device 100b, that individual 2 may, however, be immediately able to see/hear the goings-on within the local environment of device 100b. For instance, if an individual located nearby voice activated electronic device 100b is not aware that the communications session is being established, that individual may be streaming live video content from the surrounding area to the initiating individual's device (e.g., voice activated electronic device 100a). This may similarly occur if no one is presently nearby voice activated electronic device 100b—for the scenario where individuals are able to establish communications sessions even if presence is not detected thereby—as no individuals may be aware that a communications session between voice activated electronic devices 100a and 100b has been established. To afford the contact associated with voice activated electronic device 100b some discretion, in some embodiments, computing system 200 may delay, or simply not send, audio/video communications captured by voice activated electronic device 100b back to voice activated electronic device 100a immediately. Instead, in the illustrative embodiment, computing system 200 may cause device 100a to display a blank image 102a, or video. Alternatively, a frosted, blurry, or static image may be displayed by device 100a, however persons of ordinary skill will recognize that this is merely exemplary.

Displaying blank image 102a, or any other image/video, or lack thereof (as well as lack of audio), may be a first line of defense for individuals associated with voice activated electronic device 100b to prevent individual 2 from immediately being able to see and hear into their household. In some embodiments, blank image 102a may be displayed only for a predefined amount of time (e.g., a few seconds), before a live camera/microphone feed is sent to the initiating device (e.g., voice activated electronic device 100a) from the recipient device (e.g., voice activated electronic device 100b). While audible and/or visual indicators may be output by voice activated electronic device 100b in response to the communications session being established, if no one is proximate to device 100b (e.g., no one is home, no one is located in the room, etc.), then individual 2 will be able to see and/or hear into the household where device 100b is located without anyone being aware that the communications session has been established.

In order to reduce the possibility of an individual, such as individual 2, being able to establish a communications session with voice activated electronic device 100b, without the corresponding contact being aware that the communications session is occurring (e.g., without knowing that a live video/audio feed is being broadcast to voice activated electronic device 100a), process 150 may be performed. As an illustrative, non-limiting embodiment, voice activated electronic device 100a, voice activated electronic device 100b, computing system 200, and/or any other suitable device or system, may perform process 150 to determine whether speech is received from voice activated electronic device 100b after the communications session was established by voice activated electronic device 100a, and causing the communications session to end if no speech is detected. Although process 150 describes an exemplary scenario where speech activity is monitored on the recipient device side, persons of ordinary skill in the art will recognize that this is merely exemplary, and speech activity may be monitored on the initiating device's side additionally or alternatively, as described in greater detail herein.

Process 150, in one non-limiting embodiment, may begin at step 152. At step 152, first audio data may be received from an initiating device. For example, first audio data representing utterance 4 may be received by computing system 200 from voice activated electronic device 100a. In some embodiments, utterance 4 may include a wakeword (e.g., "Alexa"), where voice activated electronic device 100a may be configured to send audio data representing some or all of utterance 4 to computing system 200 in response to determining that the wakeword was uttered. However, in one embodiment, audio data representing utterance 4 may be sent to computing system 200 in response to electronic device 100a being manually activated. For example, individual 2 may press a button on electronic device 100a, which in turn may cause one or more microphones associated with electronic device 100a to begin capturing audio data, which may then be sent to computing system 200.

At step 154, computing system 200 may determine that a communications session is to be initiated with a recipient device. Upon receiving the first audio data at step 152, computing system 200, which may include a speech-processing system, may generate first text data representing the first audio data by performing speech-to-text processing to the first audio data. Using the first text data, the speech-processing system may compare the structure of the utterance to various sample utterances in an attempt to match the spoken utterance to one of the sample utterances. For example, utterance 4 may be "Alexa, Drop in on John." The speech-processing system may determine that utterance 4 has a format of "{Wakeword}, {Start Communications Session} {Contact Name}," and may identify the elements of utterance 4 based on the determined format. For instance, using the previously mentioned format, the speech-processing system may determine that an intent of utterance 4 is for a communications session to be started with a contact having the name "John." The speech-processing system may then determine a particular device associated with the contact named John that is associated with a user account linked to electronic device 100a. For instance, the first audio data, when received by computing system 200, may include a device identifier (e.g., an MAC address, a serial number, or any other identification means for device 100a), which may be used to determine a user account on computing system 200.

After identifying the user account, computing system 200 may determine if there are any contacts stored within a contact list for that user account having the identified contact's name (e.g., "John"), and may determine a user account on computing system 200 associated with that identified contact's name. Once the contact's user account is determined, a device identifier and a device address (e.g., an IP address, cellular telephone number, GPS locater, etc.) may be determined for any devices associated with the contact's user account so that computing system 200 may determine a pathway to route communications received from electronic device 100a to that contact's device(s).

In some embodiments, computing system 200 may be configured to allow certain devices to establish a communications session with other devices without requiring the recipient device's approval. For example, an individual may authorize certain user accounts, and therefore the devices associated with those user accounts, so that individuals operating those devices are capable of establishing a communications session with the individual's device. By authorizing the user accounts, in some embodiments, the individual may grant those user accounts permission to substantially immediately allow their device and the initiator's device to enter into a communications session, without needing approval to start the session. This type of permission, for instance, may be reserved for close friends or family members, similarly to the above-mentioned example of providing a close friend or family member with a key to one's home. The authorized user accounts, and thus the individuals associated with those accounts, may be provided, in one embodiment, with the ability to start communicating with the authorizer's devices—and potentially the authorizing individual—without having to wait for the authorizer to approve of any request to start a communications session.

In some embodiments, presence information may be continually tracked by electronic devices 100a and 100b, and the presence information may be provided to computing system 200. For instance, computing system 200 may include a presence tracking system that stores presence information associated with one or more devices. In some embodiments, the communications session may be capable of being established only if presence is detected for both devices to participate in the communications session. For example, in order for individual 2 to establish a communications session with the contact "John" associated with electronic device 100b, that contact would need to be located proximate to electronic device 100b. If the presence tracking system of computing device 200, however, determines that no one is present nearby electronic device 100b, then the presence tracking system may indicate to a communications system of computing device 200 that the communications session may not be established at this time. However, persons of ordinary skill in the art will recognize that this is merely exemplary, and human presence be detected for both devices associated with a communications session need not always be required.

At step 156, video data may be sent to the recipient device from the initiating device. For example, electronic device 100*b* may, upon the communications session being established, receive video data representing video captured by one or more video input devices associated with electronic device 100*a*. The communications session, as mentioned previously, may allow for two (or more) individuals—via their respective devices (e.g., electronic devices 100*a*, 100*b*)—to substantially instantaneously be able to communicate with one another. In some embodiments, when the communications session is established, only the initiating device may begin sending audio/video data to the targeted recipient's device such that the recipient device may begin viewing images/audio from the initiating device. For example, in response to the communications session being established, electronic device 100*b* may begin receiving and displaying video 102*b*, captured by electronic device 100*a*. Furthermore, in this particular scenario, electronic device 100*a* may not yet begin receiving any video from electronic device 100*b*, as indicated by blank image 102*a* displayed by electronic device 100*a*. By not providing the initiating device (e.g., electronic device 100*a*) with any video/audio communications from the recipient device (e.g., electronic device 100*b*), the recipient may be given a brief amount of time to either stop the communications session, turn their video/audio feed off, or generally adjust their current situation to communicate with the initiator (e.g., individual 2). In this way, if the recipient is not ready, then he/she is afforded some additional time to ready themselves for communicating with the initiator. However, persons of ordinary skill in the art will recognize that this is merely exemplary, and in some embodiments, no delay may be employed, and the initiating device may be able to receive video/audio content from the recipient device in response to the communications session being established.

In some embodiments, the video and/or audio data may be sent to any devices associated with the recipients user account. For example, if the recipient has two devices linked to his/her user account, in response to the communications session being established, the video/audio data may be sent to both devices. Furthermore, presence information associated with the two devices may be employed to determine which recipient device to use to output the video/audio data.

At step 158, second audio data may be received by the communications system of computing system 200 from the recipient device. In some embodiments, after the communications session is started with the recipient device, the communications system may cause the recipient device to begin sending presence data to the communications system. In some embodiments, the presence data may correspond to first data indicating that first sounds were received by a first microphone of the recipient device during a first amount of time after the communications session was initiated. For example, after initiating the communications session between electronic device 100*a* and electronic device 100*b*, electronic device 100*b* to begin sending audio data representing sounds captured by its microphone(s) to a communications system. This audio data may then be analyzed by a speech activity detection system to determine whether the sounds correspond to speech or non-speech.

At step 160, a determination may be made as to whether the presence data, such as the second audio data, corresponds to speech. For instance, various speech activity detection techniques may be employed to determine whether or not human speech is present within a particular audio signal. Speech activity detection, which may also be referred to as speech detection or Voice Activity Detection ("VAD") may be employed in a variety of situations, and may be used in conjunction with other processes, such as speaker identification. Generally, speech activity detection may determine whether a given audio signal corresponds to speech, noise, or silence. For example, a speech activity detection system may determine whether an input audio signal exceeds a threshold associated with background noise. If so, that audio signal may be classified as representing speech. If the audio signal is less than the threshold, for instance, then the audio signal may be classified as representing non-speech, such as noise or silence (depending on the audio signal characteristics). In some embodiments, computing system 200 may include a speech activity detection system that is configured to receive audio data, and determine whether or not that audio data represents speech. However, persons of ordinary skill in the art will further recognize that voice activated electronic devices 100*a* and/or 100*b* may also include a speech activity detection system, and the aforementioned is merely exemplary.

If, at step 160, it is determined that the speech was received by the recipient device, then process 150 may proceed to step 162. At step 162, the second audio data may be determined to represent speech, and at step 164, the communications session may be allowed to continue. For instance, because the second data indicates that sounds corresponding to speech were received by the recipient device, this may indicate that an individual is speaking within earshot of the recipient device (e.g., electronic device 100*b*). In this instance, the individual on the receiving end is likely aware of the fact that the communications session has begun, and therefore may be able to start communicating back, thereby prevent the initiator from having a live video/audio feed into their household.

If, however, at step 160, it is determined that the second audio data received from the recipient device does not represent speech (e.g., non-speech), then process 150 may proceed to step 166. At step 166, the second audio data may be determined to represent non-speech. For example, the sounds received by the recipient device may correspond to silence, noise, or non-human based sounds (e.g., an animal, a radio/television, music, etc.). In some embodiments, speaker identification may be employed to determine whether the sounds represented by the second audio data correspond to non-human based speech. For example, speech may be detected at step 160, however based on speaker identification techniques, that speech may be identified as not corresponding to voice biometric information associated with a user account linked with the recipient device. For instance, if a television is playing in the background, speech output by the television may be classified as speech even though it is not human based. Use of speaker identification may, in some embodiments, be capable of identifying such instances and classifying that speech event as non-speech.

At step 168, the non-speech may be determined to have been detected for a first amount of time. For example, the data received may indicate that the sounds captured by the recipient device's microphone(s) during a first amount of time after the communications session was established correspond to non-speech. In some embodiments, this determination of non-speech may be performed continuously, such that if no speech is detected for a predefined amount of time, then that audio data may be determined to represent non-speech. For example, if the first amount of time is greater than a predefined threshold amount of time, then this may indicate that sounds correspond to non-speech. For instance, steps 166 and 168 may be performed in a repeating loop until non-speech has been detected for an amount of time greater than or equal to a certain threshold amount of time, at which point the speech activity detection system may classify that audio data (e.g., the second audio data) as representing non-speech.

At step 170, the communications session may be caused to end based on non-speech having been received. In some embodiments, the communications system may end the communications session by no longer sending video and/or audio data from the initiating device to the recipient device. For example, the communications system of computing system 200 may stop sending video 102b to electronic device 100b from electronic device 100a. In some embodiments, computing system 200 may generate an audible message to be output by the initiating device. For example, computing system 200 may generate message 6, indicating that no speech was detected by the recipient device, and the communications session is being ended (e.g., "Didn't hear John. Ending Drop in session.") As another example, a graphical message or other visual indicator may be displayed by the initiating device (e.g., electronic device 100a) to indicate to the initiator (e.g., individual 2) that the communications session is ending. Persons of ordinary skill in the art will recognize that the aforementioned is merely exemplary, and any suitable mechanism for indicating that the communications session may be provided, or no indication may be provided and the communications session may merely end.

In some embodiments, the communications session may be caused to end based on an absence of presence data being received from the recipient device. For example, presence data, as described herein, may correspond to speech data, image data, signal strength information (e.g., an RSSI level between a mobile device of the recipient device and the recipient device), or any other types of presence data, or any combination thereof. If the absence of presence data occurs for longer than a predefined amount of time, then this may indicate that the communications session is to end.

In some embodiments, prior to ending the communications session, an audio message and/or a visual message may be provided to the recipient device (and/or the initiating device) that indicates to an individual that the communications session is going to end unless they begin speaking. As an illustrative example, an audible counter providing a countdown message may be provided to electronic device 100b, where the countdown message counts down from a preset time to zero (e.g., "You have 30 seconds to say something or the communications session will end.") If the individual says something before the counter finishes counting down to zero, then the communications session may continue. However, if the counter reaches zero before anything is uttered, then the communications session may end. In some embodiments, a graphical user interface ("GUI") including a visual representation of the counter may also be provided to electronic device 100b. For example, the GUI may display a starting time (e.g., 30 seconds), and may count down from that starting time to zero while also outputting an audible message of the current counter time. If no speech is detected before the counter reaches zero, then the communications session may be caused to end. Persons of ordinary skill in the art will recognize that any suitable amount of time may be used for the counter, and the format of the counter (e.g., numbers, beeps, clicks, flashing lights, etc.) may be employed.

Figure 2:
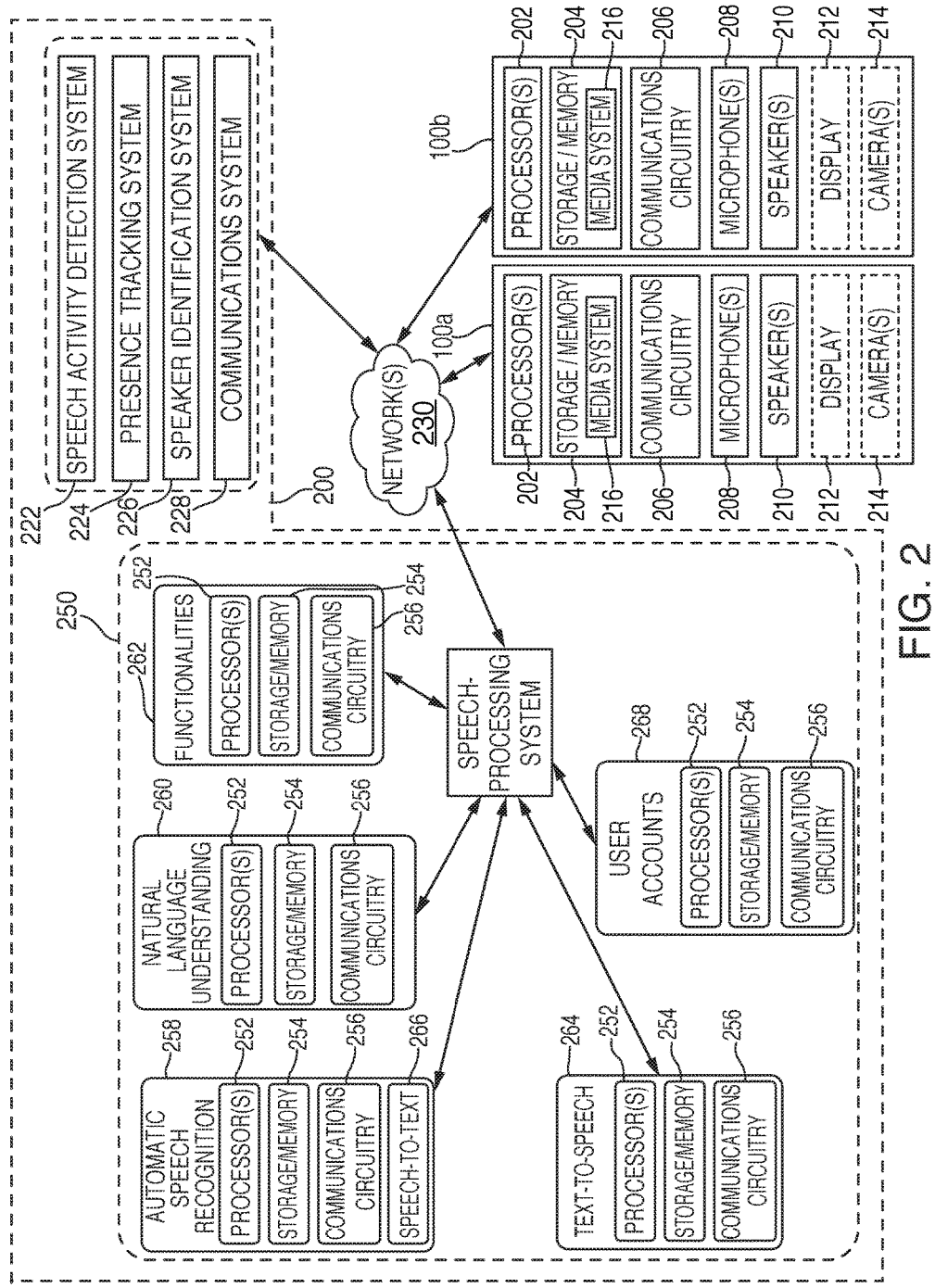
FIG. 2 is an illustrative diagram of the exemplary system architecture of FIG. 1, in accordance with various embodiments.

FIG. 2 is an illustrative diagram of the exemplary system architecture of FIG. 1, in accordance with various embodiments. Electronic devices 100a and 100b (collectively "electronic device(s) 100") may, in some embodiments, include sound controlled functionality, such as one or more voice or sound activated components. In some embodiments, electronic device 100 may be configured such that it may communicate with computing system 200, and in particular a speech-processing system 250, in response to detecting an utterance including a wakeword, which may subsequently be followed by a request/question/statement. Similarly, electronic device 100 may alternatively or additionally include one or more manually activated components for manually controlled functionality. In this particular scenario, electronic device 100 may also be configured, in one embodiment, to communicate with computing system 200, and thus speech-processing system 250, in response to a manual input being detected by one or more input mechanisms, such as a touch screen, a button, and/or a switch, for example.

In a non-limiting embodiment, electronic device 100 may be capable of being activated in response to detecting a specific sound, such as a wakeword, as well as, or alternatively, via one or more inputs. After detecting a specific sound (e.g., a wakeword or trigger expression), electronic device 100 may recognize commands (e.g., audible commands, inputs) within captured audio, and may perform one or more actions in response to the received commands. Furthermore, electronic device 100 may also be configured to perform one or more actions in response to detecting a particular touch, or mechanical, input(s) via electronic device 100.

Electronic device 100 may correspond to any suitable type of electronic device including, but are not limited to, desktop computers, mobile computers (e.g., laptops, ultrabooks), mobile phones, smart phones, tablets, televisions, set top boxes, smart televisions, personal display devices, large scale display devices (e.g., billboards, street signs, etc.), personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., ships, trains, airplanes, etc.), wearable devices (e.g., watches, pins/broaches, headphones, etc.), and/or smart accessories (e.g., light bulbs, light switches, electrical switches, etc.). In some embodiments, electronic device 100 may be relatively simple or basic in structure such that no, or a minimal number of, mechanical input option(s) (e.g., keyboard, mouse, track pad) or touch input(s) (e.g., touch screen, buttons) are included. For example, electronic device 100 may be able to receive and output audio, and may include power, processing capabilities, storage/memory capabilities, and communication capabilities. However, in other embodiments, electronic device 100 may include one or more components for receiving mechanical inputs or touch inputs, such as a touch screen and/or one or more buttons.

Electronic device 100, in one embodiment, may include a minimal number of input mechanisms, such as a power on/off switch such that functionality of electronic device 100 may solely or primarily be through audio input and audio output. For example, electronic device 100 may include, or be in communication with, one or more microphones that listen for a wakeword by continually monitoring local audio. In response to the wakeword being detected, electronic device 100 may establish a connection with computing system 200 and/or speech-processing system 250, send audio data to computing system 200 and/or speech-processing system 250, and await/receive a response from computing system 200 and/or speech-processing system 250. In some embodiments, however, non-voice/sound activated devices may also communicate with computing system 200 and/or speech-processing system 250 (e.g., push-to-talk devices). For example, in response to a button or touch screen being pressed, or a button or touch screen being pressed and held, a microphone associated with electronic device 100 may begin recording local audio, and may establish a connection with computing system 200 and/or speech-processing system 250, send audio data representing the captured audio to computing system 200 and/or speech-processing system 250, and await/receive a response from computing system 200 and/or speech-processing system 250.

Persons of ordinary skill in the art will recognize that although in the illustrative embodiment computing system 200 includes speech-processing system 250, this is merely exemplary, and speech-processing system 250 may be separate from computing system 200. For example, speech-processing system 250 may be located within a dedicated computing device or computing system, which may or may not be in communication with computing system 200 and/or one or more additional devices.

Electronic device 100 may include one or more processors 202, storage/memory 204, communications circuitry 206, one or more microphones 208 or other audio input devices (e.g., transducers), one or more speakers 210 or other audio output devices, a display screen 212, and one or more cameras 214 or other image capturing components. However, one or more additional components may be included within electronic device 100, and/or one or more components may be omitted. For example, electronic device 100 may also include a power supply or a bus connector. As still yet another example, electronic device 100 may include one or more additional input and/or output mechanisms, such as one or more buttons, or one or more switches or knobs. Furthermore, while electronic device 100 may include multiple instances of one or more components, for simplicity only one of each component has been shown.

In some embodiments, electronic device 100 may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In one embodiment, electronic device 100 may be in communication with an additional processing device including one or more of: processor(s) 202, storage/memory 204, communications circuitry 206, microphone(s) 208, speaker(s) 210, display screen 212, and/or camera(s) 214. For example, a centralized control device of electronic device 100 may include one or more microphone(s) 208. These microphone(s) 208 may receive audio input signals, which in turn may be sent to computing system 200 and/or speech-processing system 250 in response to a wakeword engine of electronic device 100 determining that a wakeword was uttered.

Processor(s) 202 may include any suitable processing circuitry capable of controlling operations and functionality of electronic device 100, as well as facilitating communications between various components within electronic device 100. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program modules, program data, and/or one or more operating systems. However, processor(s) 202 may run an operating system ("OS") for electronic device 100, and/or one or more firmware applications, media applications, and/or applications resident thereon. In some embodiments, processor(s) 202 may run a local client script for reading and rendering content received from one or more websites. For example, processor(s) 202 may run a local JavaScript client for rendering HTML or XHTML content received from a particular URL accessed by electronic device 100.

Storage/memory 204 may include one or more types of storage mediums such as any volatile or non-volatile memory, or any removable or non-removable memory implemented in any suitable manner to store data for electronic device 100. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may store one or more audible and/or visual messages to be provided to electronic device 100 for indicating that a communications session is about to end if speech is not detected. For example, storage/memory 204 may store one or more audible messages and/or GUIs that include a counter that counts down from a preset time until zero, at which point the communications session may end.

In some embodiments, storage/memory 204 may include a media system 216, which may be configured to facilitate communications between electronic devices 100 and computing system 200. For example, media system 216 may store one or more communications protocols that may be executed by processor(s) 202 for facilitating communications for device 100. In some embodiments, a sessions initiation protocol ("SIP") may be used to facilitate media transfer between electronic device 100 and one or more of computing system 200 (e.g., communications system 228) and another electronic device 100. SIP, for example, is an application layer protocol that is text based, and may employ Real-time Transport Protocol ("RTP") or Secure Real-time Transport Protocol ("SRTP") functions. In particular, PJSIP communications functionality may be employed by media system 216 to support audio, video, presence, and messaging communications for electronic device 100. In some embodiments, a Web Real-Time Communications ("WebRTC") protocols may be employed by electronic device 100. In a non-limiting embodiment, media system 216 may include instructions that indicate which communications protocols to employ for facilitating media transfer between devices based on a device type of electronic device 100. For example, if electronic device 100 does not include display 212 and/or camera 214, then media system 216 may indicate that PJSIP should be used, whereas if electronic device 100 includes display 212 and/or camera 214 then media system 216 may indicate that WebRTC protocols should be used.

In some embodiments, storage/memory 204 may include one or more modules and/or databases, such as a speech activity detection system (described in greater detail below with reference to speech activity detection system 222), a speech recognition module, a wakeword database, a sound profile database, and a wakeword detection module. The speech recognition module may, for example, include an automatic speech recognition ("ASR") component that recognizes human speech in detected audio. The speech recognition module may also include a natural language understanding ("NLU") component that determines user intent based on the detected audio. Also included within the speech recognition module may be a text-to-speech ("TTS") component capable of converting text to speech to be outputted by speaker(s) 210, and/or a speech-to-text ("STT") component capable of converting received audio signals into text to be sent to computing system 200 and/or speech-processing system 250 for processing.

The wakeword database may be a database stored locally by storage/memory 204 of electronic device 100, and may include a list of a current wakeword for electronic device 100, as well as one or more previously used, or alternative, wakewords for voice activated electronic device. In some embodiments, an individual may set or program a wakeword for their electronic device 100. The wakeword may be programmed directly on electronic device 100, or a wakeword or wakewords may be set by the individual via a local client application that is in communication with computing system 200 and/or speech-processing system 250. For example, an individual may use their mobile device having the speech-processing system application running thereon to set the wakeword. The specific wakeword may then be communicated from the mobile device to speech-processing system 250, which in turn may send/notify electronic device 100 of the individual's selection for the wakeword. The selected activation may then be stored in the wakeword database of storage/memory 204. In some embodiments, additional trigger expressions or permutations of the wakeword may also be stored within storage/memory 204. For example, specific trigger expressions or words that indicate the presence of the wakeword may also be stored within storage/memory 204. In some embodiments, audio watermarks, indicating a specific action or message, may also be stored within storage/memory 204.

In some embodiments, sound profiles for different words, phrases, commands, or audio compositions are also capable of being stored within storage/memory 204, such as within a sound profile database. For example, a sound profile of audio may be stored within the sound profile database of storage/memory 204 on electronic device 100. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection module may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally, a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the MINI models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, electronic device 100 may then begin transmitting the audio signal to speech-processing system 250 for detecting and responds to subsequent utterances made by an individual.

Communications circuitry 206 may include any circuitry allowing or enabling one or more components of electronic device 100 to communicate with one another, one or more additional devices, servers, and/or systems. For example, communications circuitry 206 may facilitate communications between electronic device 100 and computing system 200. As an illustrative example, audio data representing an utterance (e.g., utterance 4 of FIG. 1) may be transmitted over a network 230, such as the Internet, to computing system 200 using any number of communications protocols. For example, network(s) 230 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between electronic device 100 and computing system 200. In some embodiments, electronic device 100 and computing system 200 and/or one or more additional devices or systems (e.g., speech-processing system 250) may communicate with one another via a web browser using HTTP. Various additional communication protocols may be used to facilitate communications between electronic device 100 and computing system 200, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Communications circuitry 206 may use any communications protocol, such as any of the previously mentioned exemplary communications protocols. In some embodiments, electronic device 100 may include an antenna to facilitate wireless communications with a network using various wireless technologies (e.g., Wi-Fi, Bluetooth, radiofrequency, etc.). In yet another embodiment, electronic device 100 may include one or more universal serial bus ("USB") ports, one or more Ethernet or broadband ports, and/or any other type of hardwire access port so that communications circuitry 206 allows electronic device 100 to communicate with one or more communications networks.

Electronic device 100 may also include one or more microphones 208 and/or transducers. Furthermore, one or more microphones located within a separate device may be in communication with electronic device 100 to capture sounds for electronic device 100. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, electronic device 100 may include multiple microphones (e.g., four, seven, ten, etc.) placed at various positions about electronic device 100 to monitor/capture any audio outputted in the environment where electronic device 100 is located. The various microphones 208 may include some microphones optimized for distant sounds, while some microphones may be optimized for sounds occurring within a close range of electronic device 100. In some embodiments, microphone(s) 208 may only begin to detect audio signals in response to a manual input to electronic device 100. For example, a manually activated device may begin to capture audio data using microphone(s) 208 in response to a user input, such as pressing a button, tapping a touch screen, or providing any touch input gesture to a touch input component.

Electronic device 100 may include one or more speakers 210. Furthermore, electronic device 100 may be in communication with one or more speaker(s) 210. Speaker(s) 210 may correspond to any suitable mechanism for outputting audio signals. For example, speaker(s) 210 may include one or more speaker units, speaker housings, transducers, arrays of speakers, and/or arrays of transducers that may be capable of broadcasting audio signals and or audio content to a surrounding area where electronic device 100 may be located. In some embodiments, speaker(s) 210 may include headphones or ear buds, which may be wirelessly wired, or hard-wired, to electronic device 100, that may be capable of broadcasting audio directly to an individual.

In some embodiments, one or more microphones 208 may serve as input devices to receive audio inputs. Electronic device 100, in the previously mentioned embodiment, may then also include one or more speakers 210 to output audible responses. In this manner, electronic device 100 may function solely through speech or audio, without the use or need for any input mechanisms or displays, however this is merely exemplary.

Display screen 212 may correspond to a display device and/or touch screen, which may be any size and/or shape and may be located at any portion of electronic device 100. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, display screen 212 may correspond to a projected capacitive touch ("PCT"), screen include one or more row traces and/or driving line traces, as well as one or more column traces and/or sensing lines. In some embodiments, display screen 212 may be an optional component for electronic device 100. For instance, electronic device 100 may not include display screen 212. Such devices, sometimes referred to as "headless" devices, may output audio, or may be in communication with a display device for outputting viewable content.

Display screen 212, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of display screen 212, a capacitance between the object and the conductive material may be formed. Processor(s) 202 may be capable of determining a location of the touch screen associated with where the capacitance change is detected, and may register a touch input as occurring at that location.

In some embodiments, display screen 212 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. Persons of ordinary skill in the art will recognize that one or more additional layers, or spaces between layers, may be included. Furthermore, persons of ordinary skill in the art will recognize that any number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on display screen 212 corresponding to where a conductive object contacted display screen 212.

A change in capacitance may be measured to determine a location on the touch screen where the object has contacted the surface. For example, if an individual touches a point on display screen 212, then a corresponding driving line and sensing line that intersect at that point may be identified. A location of the point may have one or more pixels associated with that location, and therefore one or more actions may be registered for an item or items that are displayed at that location. Processor(s) 202 of electronic device 100 may be configured to determine which pixels are associated with a particular location point, and which item or items are also displayed at that pixel location. Furthermore, electronic device 100 may be configured to cause one or more additional actions to occur to the item or items being displayed on display screen 212 based on a temporal duration the touch input, and or if one or more additional touch inputs are detected. For example, an object that contacted display screen 212 at a first location may be determined, at a later point in time, to contact display screen 212 at a second location. In the illustrative example, an object may have initially contacted display screen 212 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen 212 having 100 driving lines and 100 sensing lines may have 100 intersection points, and therefore 100 individual capacitors, while a touch screen display screen 212 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by electronic device 100, and therefore the fewer driving lines and/or sensing lines used, the smaller the amount of power that is needed to operate the touch screen display.

In some embodiments, display screen 212 may correspond to a high-definition ("HD") display. For example, display screen 212 may display images and/or videos of 720p, 1080p, 1080i, or any other image resolution. In these particular scenarios, display screen 212 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 2,073,600 pixels. However, persons of ordinary skill in the art will recognize that the aforementioned display ratios and pixel numbers are merely exemplary, and any suitable display resolution or pixel number may be employed for display screen 212, such as non-HD displays, 4K displays, and/or ultra high definition displays.

In some embodiments, electronic device 100 may include one or more cameras 214, corresponding to any suitable image capturing component or components capable of capturing one or more images and/or videos. Camera(s) 214 may, in some embodiments, be configured to capture photographs, sequences of photographs, rapid shots (e.g., multiple photographs captured sequentially during a relatively small temporal duration), videos, or any other type of image, or any combination thereof. In some embodiments, electronic device 100 may include multiple cameras 214, such as one or more front-facing cameras and/or one or more rear facing cameras. Furthermore, camera(s) 214 may be configured to recognize far-field imagery (e.g., objects located at a large distance away from electronic device 100) or near-filed imagery (e.g., objected located at a relatively small distance from electronic device 100). In some embodiments, the camera(s) may be high-definition ("HD") cameras, capable of obtaining images and/or videos at a substantially large resolution (e.g., 726p, 1080p, 1080i, etc.). In some embodiments, camera(s) 214 may be optional for electronic device 100. For instance, camera(s) 214 may be external to, and in communication with, electronic device 100. For example, an external camera may be capable of capturing images and/or video, which may then be provided to electronic device 100 for viewing and/or processing.

Persons of ordinary skill in the art will recognize that, in some embodiments, display screen 212 and/or camera(s) 214 may be optional for electronic device 100. For instance, electronic device 100 may function using audio inputs and outputting audio, and therefore display screen 212 and/or camera(s) 214 may not be included. Furthermore, in some embodiments, electronic device 100 may not include display screen 212 and/or camera(s) 214, but instead may be in communication with display screen 212 and/or camera(s) 214. For example, electronic device 100 may be connected to a display screen via a Wi-Fi (e.g., 802.11 protocol) connection such that visual content sent to electronic device 100 may be sent to the display screen, and output thereby.

In one exemplary embodiment, electronic device 100 may include an additional input/output ("I/O") interface. For example, electronic device 100 may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of electronic device 100 may include one or more lights, light emitting diodes ("LEDs"), or other visual indicator(s). Persons of ordinary skill in the art will recognize that, in some embodiments, one or more features of the output portion of the I/O interface may be included in a purely voice activated version of electronic device 100. For example, one or more LED lights may be included on electronic device 100 such that, when microphone(s) 208 receive audio, the one or more LED lights become illuminated signifying that audio has been received by electronic device 100. In some embodiments, one or more vibrating mechanisms or other haptic features may be included with electronic device 100 to provide a haptic response to an individual.

In some embodiments, electronic device 100 may include radio-frequency identification ("RFID") functionality and/or near field communication ("NFC") functionality. Furthermore, in some embodiments, electronic device 100 may include one or more infrared ("IR") sensors and one or more IR emitters. The IR sensors/emitters may be used to determine depth information. For example, in one embodiment, a distance of an individual from electronic device 100 may be determined using the one or more IR sensors/emitters. Depth determination may be performed using any depth determination technique. In some embodiments, a distance between an individual and electronic device 100 may be employed as a basis for presenting content with varying density using display screen 212. For example, when an individual is at a distance A from electronic device 100, electronic device 100 may display weather data for a current day. However as the user moves closer to electronic device 100, such as at a distance B from electronic device 100, which may be less than distance A, electronic device 100 may display weather data for a current week. For instance, as the individual gets closer to electronic device 100, the ability of the individual to see denser content increases, and as the individual moves father away from electronic device 100, the individual's ability to see denser content decreases. This, for example, may ensure that the content displayed by electronic device 100 is continually relevant and readable by the individual.

Computing system 200, in a non-limiting, exemplary embodiment, may include speech-processing system 250. However, in other embodiments, speech-processing system 250 may be separate from, or in communication with, computing system 200. Generally, speech-processing system 250 may, in some embodiments, include one or more remote devices capable of receiving and sending content from/to one or more electronic device, such as electronic device 100. Speech-processing system 250 may include various components and modules including, but not limited to, automatic speech recognition ("ASR") module 258, natural language understanding ("NLU") module 260, functionalities module 262, text-to-speech ("TTS") module 264, and user accounts module 268. In some embodiments, speech-processing system 250 may also include computer readable media, including, but not limited to, flash memory, random access memory ("RAM"), and/or read-only memory ("ROM"). Speech-processing system 250 may also include various modules that store software, hardware, logic, instructions, and/or commands for speech-processing system 250, such as a speaker identification ("ID") module, or any other module, or any combination thereof.

ASR module 258 may be configured to recognize human speech in detected audio, such as audio captured by microphone(s) 208, which may then be transmitted to speech-processing system 250. ASR module 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. In some embodiments, ASR module 258 may include speech-to-text ("STT") module 266. STT module 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

ASR module 258 may include an expression detector that analyzes audio signals received by speech-processing system 250, such as the expression detector mentioned above with regards to electronic device 100. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword or phrase, is represented within the audio signal. The expression detector may then compare that score to a threshold value to determine whether the wakeword or phrase will be declared as having been spoken.

NLU module 260 may be configured such that it determines user intent based on the received audio data. For example, NLU module 260 may determine that the intent of utterance 4 is for initiating a communications session with a device, associated with a particular name (e.g., initiate a communications session with "John"). In response to determining the intent of the utterance, NLU module 260 may communicate the received command to an appropriate subject matter server or skill on functionalities module 262 to perform one or more tasks, and/or retrieve an appropriate response or response information. NLU module 260 may include processor(s) 252, storage/memory 254, and communications circuitry 256 which, in one embodiment, may be substantially similar to processor(s) 202, storage/memory 204, and communications circuitry 206 of electronic device 200, and the previous description may apply.

Functionalities module 262 may, for example, correspond to various action specific systems or servers, sometimes referred to as "skills," capable of processing various task specific actions. Functionalities module 262 may further correspond to first party applications and/or third party applications capable of performing various tasks or actions. For example, based on the context of the audio received from electronic device 100, speech-processing system 250 may use a certain functionality to generate a response, or to obtain response information, which in turn may be communicated back to electronic device 100. For instance, an utterance may ask for weather information, and therefore functionalities module 262 may access a weather application to obtain current weather information for a location associated with electronic device 100. Functionalities module 262 may also include processor(s) 252, storage/memory 254, and communications circuitry 256.

TTS module 264 may employ various text-to-speech techniques. However, techniques for transcribing speech into text are well known in the art and need not be described in further detail herein, any suitable computer implemented speech to text technique may be used to convert the received audio signal(s) into text, such as SOFTSOUND speech processing technologies available from the Autonomy Corporation, which is headquartered in Cambridge, England, United Kingdom. TTS module 264 may also include processor(s) 252, storage/memory 254, and communications circuitry 256.

User accounts module 268 may store one or more user profiles corresponding to users having a registered account on computing system 200. For example, a parent may have a registered account on computing system 200, and each of the parent's children may have their own user profile registered under the parent's registered account. Information, settings, and/or preferences, for example, for each user profile may be stored within a user profile database. In some embodiments, user accounts module 268 may store a voice signal, such as voice biometric information, for a specific user profile. This may allow speaker identification techniques to be used to match a voice to voice biometric data associated with a specific user profile. In some embodiments, user accounts module 268 may store a telephone number assigned to a particular user profile.

Persons of ordinary skill in the art will recognize that although each of ASR module 258, NLU module 260, subject matter/skills module 262, TTS module 264, and user accounts module 268 may each include instances of processor(s) 252, storage/memory 254, and communications circuitry 256, and those instances of processor(s) 252, storage/memory 254, and communications circuitry 256 within each of ASR module 258, NLU module 260, functionalities module 262, TTS module 264, and user accounts module 268 may differ. For example, the structure, functionality, and style of processor(s) 252 within ASR module 258 may be substantially similar to the structure, functionality, and style of processor(s) 252 within NLU module 260, however the actual processor(s) 252 need not be the same entity.

Computing system 200, in a non-limiting embodiment, may also include a communications system including a speech activity detection system 222. Speech activity detection system 222 may correspond to any device(s) or system(s) capable of performing speech activity detection techniques to received audio data in order to determine whether or not that audio data represents speech. Speech activity detection system 222 may be configured for use in many different VAD application including, but not limited to, speech coding, speech enhancement, speech recognition. For example, similarly to speech recognition functionality employed by ASR module 258, speech activity detection system 222 may determine whether a given audio signal represents speech or non-speech. In some embodiments, speech activity detection system 222 may employ various techniques to recognize speech with audio data including, but not limited to, spectral reduction techniques, frame dropping techniques, feature extraction techniques, and/or noise estimation techniques. Persons of ordinary skill in the art will recognize that, in some embodiments, speech activity detection system 222 may be included within electronic device 100, and/or may be included within one or more additional communications system, and the inclusion of speech activity detection system 222 within computing system 200 is merely exemplary.

Generally speaking, the problem of identifying speech within audio data becomes more difficult the noisier the input audio signal is. Therefore, subtracting the noise from the input audio signal may provide a better sense of the overall non-noise audio signal, which may then be analyzed. In some embodiments, extracting the non-noise portion of the input audio signal may be broken down into functional processes: feature extraction, classification of the input signal, and smoothing. Feature extraction, for example, looks at the input audio signal and attempts to determine portions of the input audio signal representative of known speech. This process, for instance, may function substantially similarly to keyword spotting technology, as described in greater detail above. Classification processing may correspond to a rule-based process for assigning portions of the input audio signal as being one of speech or silence. For instance, an audio input signal may be classified at various discrete intervals as being associated with speech, or silence, depending on an intensity level of the audio signal at each discrete temporal interval. If the audio input signal is greater than a predefined threshold value defining a difference between noise or not noise, then that audio input signal may be classified as being associated with not being silence. In some embodiments, a discrete Fourier Transform ("DFT") or Fast Fourier Transform ("FFT") may be performed to the audio data. Based on a known and/or determined signal to noise ratio ("SNR"), a classification may be made as to whether or not each discrete speech coefficient corresponds to speech or non-speech. Smoothing, in some embodiments, may correspond to a process for improving/enhancing the true (e.g., non-noise) audio signal against the noise. Persons of ordinary skill in the art will recognize that the aforementioned description of speech activity detection system 222 is merely exemplary, and any suitable process may be employed to determine whether audio data represents speech or non-speech.

Upon receipt of audio data representing sounds, speech activity detection system 222, or any other suitable component or module of computing system 200, may segment the audio data into overlapping audio frame. For example, the audio frames may have a temporal length of a few milliseconds, however persons of ordinary skill in the art will recognize that any suitable temporal length may be used. A spectral representation (e.g., an amount of energy) of the audio data associated with each of the overlapping audio frames may then be determined. In some embodiments, a FFT may be performed on the overlapping audio frames.

In some embodiments, an initial choice for a background noise threshold may be determined based on energy values previously determined. For instance, a mean energy may be used, where the mean energy is determined using the energies of each audio frame. Using the mean energy as an initial threshold may allow a reasonable classification technique in the temporal domain to be employed, where any frame having an energy greater than the mean energy would correspond to a frame include speech, and any frame having an energy less than or equal to the main energy would correspond to non-speech. In the frequency domain, a slightly different classification technique may be employed, where various frequency bands are selected, and the energy of each audio frame is binned into one of the frequency bands. A given audio frame may be said to correspond to speech if the lowest frequency band is active and two out of the remaining frequency bands are also active. However, as mentioned previously, persons of ordinary skill in the art will recognize that the aforementioned speech analysis techniques are merely exemplary, and any suitable technique, or combination of techniques, may be employed.

Computing system 200, in a non-limiting embodiment, may also include a presence tracking system 224. Presence tracking system 224 may be configured to determine human presence proximate to an electronic device, such as electronic device 100. In some embodiments, presence tracking system 224 may receive image data from electronic device 100 at various times, and based on that image data, determine whether the an individual, or a portion of an individual, is located with view of camera(s) 214. However, in other embodiments, presence tracking system 224 may receive presence information from electronic device 100, and may store this presence information and/or provide the presence information to one or more additional systems or devices. For example, electronic device 100 may employ various image recognition techniques, such as focus sweeps, motion vectors, edge detection, flash exposure, idle image comparisons, and/or skin tone identification, to attempt to identify whether camera(s) 214 includes a portion of a human, such as a human body part (e.g., face, eyes, mouth, torso, etc.). If so, this may indicate that an individual is located nearby electronic device 100. This information, referred to generally as "presence information," may then be sent to presence tracking information system 224. In this way, presence tracking system 224 may continually track and monitor whether any individuals are located proximate to electronic device 100.

However, persons of ordinary skill in the art will recognize that additional techniques may be employed by electronic device 100 (as well as, or alternatively, one or more additional devices), in order to determine whether presence is detected for electronic device 100. For example, recent activity with electronic device 100 may be used to indicate that an individual is nearby electronic device 100. In this particular scenario, an individual that is currently, or has recently been, interacting with electronic device 100 may indicate that that individual is still located substantially near electronic device 100. As another example, IR emitters/sensors may be employed to determine a distance away from electronic device 100 that an individual currently is. As still yet another example, received signal strength indication ("RSSI") levels may be employed to determine an approximate signal strength between a mobile device and electronic device 100. Using the RSSI levels, presence information indicating presence, or an absence of presence, for electronic device 100, may be determined. In some embodiments, presence data indicating presence information may be provided to computing system 200, such as to presence tracking system 224.

Speaker identification system 226, in some embodiments, may correspond to any suitable device/system capable of identifying a particular person's voice from an audio signal. Speaker identification system 226 may determine whether a current voice being used to speak matches known voice biometric data associated with a particular individual's voice. In some embodiments, voice biometric data may be stored within user accounts module 268 for various individuals having a user profile stored thereby. For example, individual 2 may have a user account on computing system 200 (e.g., stored within user accounts module 268), which may be associated with electronic device 100a. Stored within the user account may be voice biometric data associated with a voice of individual 2. Therefore, when an utterance, such as utterance 4, is detected by electronic device 100a, and subsequently when audio data representing that utterance is received by computing system 200, speaker identification system 226 may determine whether the voice used to speak utterance 4 matches to at least a predefined confidence threshold the stored voice biometric information associated with individual 2 stored by their user account. If so, then this may indicate that individual 2 is the likely speaker of utterance 4.

Computing system 200 may also include, in a non-limiting embodiment, a communications system 228, which may be configured to facilitate communications between two or more electronic devices. For example, communications system 228 may be capable of facilitating a communications session between electronic device 100a and at least electronic device 100b. Upon speech-processing system 250 determining that an intent of an utterance is for a communications session to be established with another device, computing device 200 may access communications system 228 to facilitate the communications session between the initiating device and the receiving device. For example, communications system 228 may employ VoIP functionality to facilitate audio, video, and/or text data communications between the initiating device and the recipient device.

As an illustrative example, a communications session between two devices is described below to illustrate how the communications session may be established. In one example embodiment, an individual (e.g., individual 2) may speak an utterance (e.g., "Alexa, drop in on Mom") to their electronic device (e.g., electronic device 100a). In response to detecting the device's wakeword (e.g., "Alexa"), the electronic device may begin sending audio data representing the utterance to computing system 200, and in particular speech-processing system 250. Upon receipt, ASR module 250 may perform speech recognition processing, such as speech-to-text processing, to the audio data to generate text data representing the audio data. The text data may then be passed to NLU module 260 to determine an intent of the utterance. For example, NLU module 260 may include a listing of sample utterances to be used to disambiguate the spoken words and determine an action intended to occur for the utterance. In some embodiments, a calling speechlet module may be included within NLU module 260 that includes one or more sample utterance frameworks. If the format of the spoken utterance substantially matches one of these sample utterances, then that may indicate that an intent of the utterance was for a communications session to be initiated. For instance, one example sample utterance may be "{Wakeword}, drop in on {Contact Name}." If the spoken utterance's text data substantially matches this sample utterance's framework, then NLU module 260 may determine that the intent of the utterance was to start a communications session with a contact of the user, and may also determine that the intended target of the communications session is "Mom" (e.g., {Contact Name}: Mom).

After determining that a communications session with a contact named "Mom" is to be established, communications system 228 may access user accounts module 268 to determine a device identifier (e.g., a device address) associated with the contact, "Mom." Additionally, communications system 228 may determine whether or not the user account associated with the initiating device (e.g., the device that the utterance was spoken to) has permission to establish a communications session with the user account associated with the targeted contact. If, in one embodiment, the user account has not been granted permission to establish a communications session with the targeted contact, then communications system 228 may access TTS module 264, which may generate and send audio data representing a message to the initiating device indicating that he/she does not have permission to establish a communications session with the intended target. Furthermore, communications system 228 may generate and send instructions to the initiating device, which may indicate that the initiating device is to stop sending video/audio data to computing system 200 for the communications session. In some embodiments, however, the instructions may be stored within media system 216, and a command to execute these instructions locally on the initiating device may be sent.

If the intended target has granted the user account permission to establish communications sessions with their device(s), then communications system 228 may begin establishing the communications session with the targeted contact's electronic device. In some embodiments, communications system 228 may first access presence tracking system 224 to determine whether or not presence is detected proximate to any of the devices associated with the targeted contact. For example, if the targeted contact has two voice activated electronic devices associated with its user account, presence information may be tracked for both devices, and communications system 228 may access presence tracking system 224 to determine which, if any, of the devices current presence information indicates a likelihood that a human is presently located proximate to that device. If presence tracking system 224 indicates that no one is presently nearby any of the devices, then communications system 228 may determine that the communications session is not to be established, and therefore may end instruct the initiating device to stop sending audio/video data (e.g., similar to as described above for the lack of permission scenario). If presence tracking system 224 indicates that human presence is currently detected by both devices, then communications system 228 may employ one or more rules for determining which device is to be used for the communications session (e.g., based on communications session history, preference, facial recognition, etc.). However, for purely illustrative purposes, in this exemplary scenario, only one of the devices detects presence, and therefore that device is used for establishing the communications session with the initiating device.

In some embodiments, communications system 228 may establish a communications session between the initiating device and the recipient device using one or more VoIP protocols including, but not limited to SIP, RTP, RTCP, SRTP, and SDP. In one illustrative embodiment, media system 216 provides a SIP signaling command to communications system 228 for communicating with media system 216 of the recipient device. In particular, PJSIP functionality adds a new "user-to-user" head that indicates the device pair for the communications session. The recipient device receives a request to start the communications session with the initiating device, and checks to see whether or not that initiating device is authorized to establish communications sessions therewith. If not, then the recipient device's media system 216 may generate and send an instruction to communications system 228 that causes the communications session to end. Typically this step would not occur as the initiating device may also check, prior to the recipient device receiving the request, to see if he/she is authorized to establish a communications session, however in some embodiments the check may be performed by both endpoints.

If the initiating device determines that the recipient device is authorized to establish communications session therewith, then media system 216 of the recipient device may send an accept call command to communications system 228, indicating that the communications session may begin. In response to receiving the accept call command, communications system 228 may send a 200 (OK) message to a SIP Proxy running on communications system 228 for facilitating the communications session. A 200 (OK) is a standard response that indicates a successful HTTP request. The SIP Proxy may act as an intermediary server/client for making requests for both the initiating device and the recipient device for routing communications to/from either device. After receiving the 200 (OK) message, the SIP Proxy may send another 200 (OK) message to the initiating device, which may acknowledges receipt using an ACK (e.g., an acknowledgement). In turn, a SIP Dialog may be established by communications system 228 for the communications session, and media systems 216 of both the initiating device and the recipient device may connect to the SIP Dialog, and the two devices may now communicate with one another.

Furthermore, persons of ordinary skill in the art will recognize that speech activity detection system 222, presence information system 224, speaker identification system 226, and/or communications system 228 may be located external to computing system 200, and the inclusion of speech activity detection system 222, presence information system 224, speaker identification system 226, and communications system 228 within computing system 200 is merely illustrative.

Figure 3:
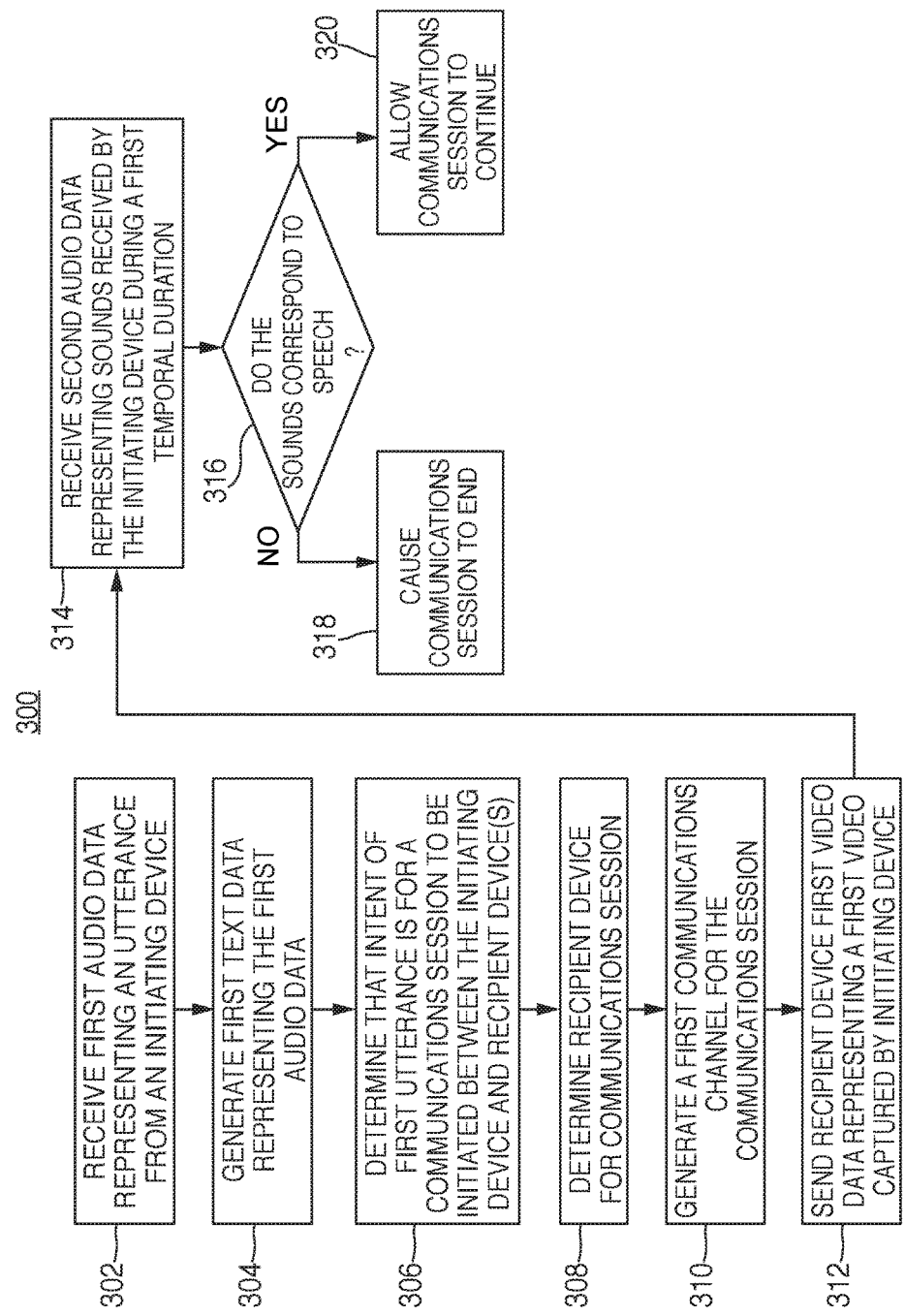
FIG. 3 is an illustrative flowchart of an exemplary process for determining whether non-speech is detected by an initiating device, in accordance with various embodiments.

FIG. 3 is an illustrative flowchart of an exemplary process for determining whether non-speech is detected by an initiating device, in accordance with various embodiments. Process 300, in the non-limiting embodiment, may begin at step 302. At step 302, first audio data representing a first utterance may be received from an initiating device. For instance, individual 2 may speak utterance 4 to electronic device 100a. In some embodiments, utterance 4 may be prefaced by a wakeword (e.g., "Alexa"), which in turn may cause electronic device 100a to begin sending audio data representing utterance 4 to computing system 200, and in particular speech-processing system 250. However, in some embodiments, the first audio data may be sent in response to the initiating device being manually activated.

At step 304, first text data representing the first audio data may be generated. For example, upon being received, the first audio data may be provided to ASR module 258, which may begin performing automatic speech recognition processing to the first audio data. For instance, STT module 266 may be employed to perform speech-to-text processing to the first audio data, thereby generating the first text data. At step 306, the first text data may be provided to NLU module 260, which may determine that an intent of the first utterance is for a communications session to be initiated between the initiating device and a recipient device. For example, NLU module 260 may determine, using the first text data, that the utterance (e.g., utterance 4) has a format substantially matching one or more sample utterances associated with initiating a communications session. At step 308, the recipient device for the communications session may be determined. Using the sample utterance framework, NLU module 260 may determine that the intended target of such a communication session. In some embodiments, the user account associated with the initiating device may be searched to determine an intended target. For example, the intended target from utterance 4 may be someone by the name "John." In this particular scenario, the user account associated with individual 2 may be searched for contact's having the name "John," and a device (e.g., electronic device 100b) associated with that contact may be identified as the target for the communications session. In some embodiments, computing system 200 may also determine whether or not the identified target has authorized the initiating device for initiating communications session therewith.

In some embodiments, prior to generating a communications channel for the communications session, communications system 228 may access presence tracking system 224 to obtain presence information for intended recipient device. The presence information may indicate whether or not a human is presently located proximate to the recipient device. If so, communications system 228 may establish the communications session. However, if the presence information indicates that no humans are currently located proximate to the recipient device, then communications system 228 may prevent the communications session from being established. Persons of ordinary skill in the art will recognize that presence being detected proximate to a recipient device need not always be employed for allowing a communications session to be established.

At step 310, a first communications channel may be generated for the communications session. In some embodiments, the first communications channel may facilitate communications to be send/received to and from the initiating device and the recipient device. At step 312, the recipient device may be sent first video data representing first video captured by the initiating device. As mentioned previously, in some embodiments, an individual may authorize other individual's such that they have the ability to establish a communications session with them without the need for explicit approval for the communications session to begin. Typically such permissions may be granted to trusted contacts, such as close friends or family members. As a result, a recipient device may, upon an initiating device starting the communications session therewith, substantially immediately begin receiving video and/or audio data from the initiating device. As an illustrative example, in response to electronic device 100a initiating a communications session with electronic device 100b, electronic device 100a may immediately start sending video captured thereby to electronic device 100b. Furthermore, electronic device 100b may, upon receiving the video, begin outputting the video thereon such that any individuals capable of viewing electronic device 100b may see the video captured by electronic device 100a. Persons of ordinary skill in the art will recognize that although video data is described as being sent at step 312, audio data and/or text data may additionally, or alternatively, be sent from the initiating device to the recipient device. For example, if either the recipient device or the initiating device is a "headless" device (e.g., no camera/display screen), then only audio communications may be capable of being transmitted.

At step 314, second audio data representing sounds received by the initiating device during a first temporal duration may be received by speech activity detection system 222. The second audio data may correspond to audio captured by microphone(s) 208 of the initiating device during a first temporal duration after the communications session has begun. For instance, speech activity detection system 222 may receive and monitor speech activity during a first amount of time after the communications session is established to ensure that the initiator does not drop in on a particular individual's household without the individual being aware that he/she is participating in the communications session. Therefore, the initiating device's operator may not be able to simply start a communications session and thereby having a direct communications line into the recipient's household. One way to prevent this from occurring, therefore, is to determine whether or not the individual who initiated the communications session says anything after starting the communications session.

In some embodiments, data indicating that first sounds were received by one or more microphones associated with the initiating device may be received. In this particular scenario, the data may be received by computing system 200, the initiating device, and/or one or more additional communications system. For instance, that data may be used by a speech activity detection system, such as speech activity detection system 222, determine whether the sounds correspond to speech, or whether the sounds correspond to non-speech.

At step 316, a determination may be made as to whether the sounds represented by the second audio data correspond to speech. For instance, speech activity detection system 222 may analyze the second audio data and determine whether or not the second audio data represents speech or non-speech (e.g., noise, silence, etc.). If, at step 316, speech activity detection system 222 determines that the sounds represent speech, then process 300 may proceed to step 320. For instance, the first sounds may be determined to correspond to speech. In this particular scenario, process 300 may proceed to step 320. At step 320, the communications session may be allowed to continue, as the initiator is likely speaking to the recipient, or intended recipient, and therefore not merely having an open video/audio feed into the recipient's household. In one embodiment, communications system 228 may facilitate communications being sent from an initiating device (e.g., electronic device 100a) to a recipient device (e.g., electronic device 100b). For example, communications system 228 may facilitate communications using VoIP communications functionality, SIP, and/or WebRTC.

If, however, at step 316, speech activity detection system 222 determines that the sounds do not represent speech, then speech activity detection system 222 may generate an instruction for computing system 200 to cause the communications session to end. For example, if speech activity detection system 222 determines that electronic device 100a is detecting silence for a first amount of time after the communications session begins, then communications system 228 may end the communications session so that individual 2 is not able to "listen"-in to the goings-on associated with electronic device 100b. For example, communications system 228 may end the communications session by preventing video, audio, and/or text data from being sent to the recipient device. As another example, communications system 228 may end the communications session by instructing the initiating device to no longer send video, audio, and/or text data. Further still, communications system 228 may end the communications system by closing the communications channel for the communications session.

In some embodiments, data indicating that first sounds were received by one or more microphones of the initiating device during a first amount of time after the communications session was initiated may be received, and a first time that the first sounds were received may also be determined. In the illustrative embodiment, the first sounds may correspond to non-speech. Second data indicating that second sounds were also received by the microphone(s) during a second amount of time after and end of the first amount of time may be received, where a second time that the second sounds were received may also be determined. In the illustrative embodiment, it may be determined that the second sounds also correspond to non-speech.

In some embodiments, a third amount of time between the first time and the second time may be determined. If the third amount of time is greater than or equal to a predefined temporal threshold value, then it may be determined that the communications session should end based, at least in part, on the first sounds and the second sounds corresponding to non-speech and the third amount of time being greater than the predefined temporal threshold value. If, alternatively, the first or second sounds are determined to correspond to speech, and/or if the third amount of time is determined to be less than the predefined temporal threshold value, then the communications session may be allowed to continue, at least for a certain amount of time more.

More generally, in some embodiments, a first request to establish a communications session with one or more devices may be received. For instance, a communications system and/or an initiating device may receive a request to establish a communications session with other devices. The communications session may be caused to be established between an initiating device and the one or more devices. If an absence of presence data—such as speech data—associated with the initiating device is determined to be received during the communications session, then the first communications session may be caused to end.

In some embodiments, prior to ending the communications session, an audio message and/or a visual message may be provided to the recipient device (and/or the initiating device) that indicates to an individual that the communications session is going to end unless they begin speaking. For example, the GUI may display a starting time (e.g., 30 seconds), and may count down from that starting time to zero while also outputting an audible message of the current counter time. If no speech is detected before the counter reaches zero, then the communications session may be caused to end.

Figure 4:
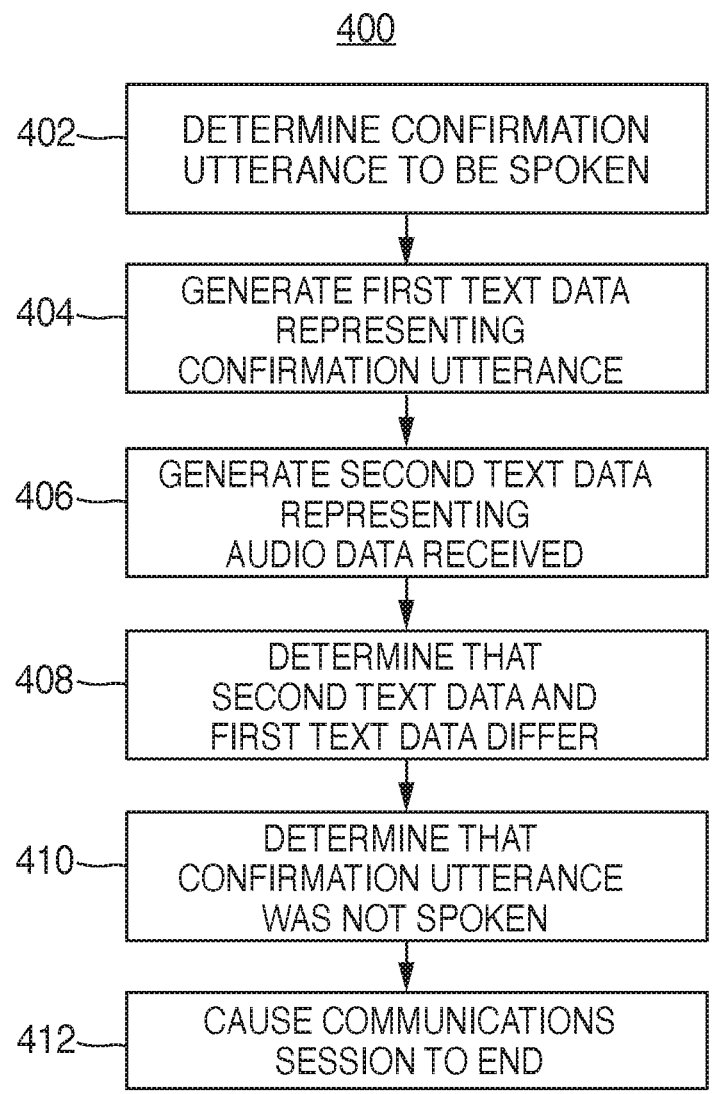
FIG. 4 is an illustrative flowchart of an exemplary process for determining non-speech activity using speech recognition processing techniques, in accordance with various embodiments.

FIG. 4 is an illustrative flowchart of an exemplary process for determining non-speech activity using speech recognition processing techniques, in accordance with various embodiments. Process 400, in a non-limiting embodiment, may begin at step 402. At step 402, a confirmation utterance to be spoken may be determined. For instance, as mentioned previously with regard to FIG. 3, after a communications session is established by an initiating device, sounds received by one or more microphones 208 of the initiating device (e.g., electronic device 100a) may be monitored to determine whether or not speech is detected. Similarly, process 400 may also be employed for communications received by a recipient device to determine whether sounds received by one or more microphones of the recipient device correspond to speech or non-speech.

One way that this may be accomplished may be to require the initiator to speak a particular confirmation utterance, which may indicate to speech activity detection system 222 and/or communications system 228, as well as a recipient associated with the recipient device (e.g., electronic device 100b), the initiator's presence. As an illustrative example, the confirmation utterance may be selected based on the particular contact that the communications session is being established with. For instance, a sample confirmation utterance may be of the form, "{Contact Name}—Are you ready?" or "Hey, {Contact Name}. Are you available?" In this particular scenario, the input {Contact Name} may be filled in using the contact name associated with the recipient device. For example, using utterance 4, the contact name may be {Contact Name}:John—and the confirmation utterance may become "John—Are you ready?"

In some embodiments, the confirmation utterance may be based on a predefined word or phrase selected by the initiator and/or recipient. For example, upon authorizing certain individuals with the ability to establish a communications session, a particular passphrase or password may be selected by the two participants. This may allow communications system 228 to access the appropriate confirmation utterance that has been previously selected in response to the communications session being established. At step 404, first text data representing the confirmation utterance may be generated. However, persons of ordinary skill in the art will recognize that, in some embodiments, the first text data representing the confirmation utterance may be stored by communications system 228, or within user accounts module 268, and therefore the first text data may not be generated in response to the communications session starting, but instead may be retrieved from memory. For instance, in this particular scenario, steps 402 and 404 may be combined into a single step.

At step 406, second text data representing audio data received by the initiating device may be generated. For example, in response to the communications session being established, communications system 228 may instruct obtain audio data representing sounds captured by microphone(s) 208 of the initiating device, and may provide speech-processing system 250 with the audio data. In the illustrative embodiment, speech-processing system 250 may then be instructed to perform speech-to-text processing to the audio data (e.g., using ASR module 258) to generate the second text data representing the audio data. The second text data may then be provided back to communications system 228. At step 408, a determination may be made that the second text data and the first text data differ. This may indicate that the confirmation utterance, which was expected to be spoken after the communications session begins, was not said. For instance, if the confirmation utterance was "John—Are you ready?" but the audio data represented silence, then the first text data and the second text data would not match, as the second text data would correspond to no words. Persons of ordinary skill in the art will recognize that although the comparison of the first text data and the second text data occurs on communications system 228 in the example embodiment, this is merely exemplary, and the comparison may alternatively be performed by speech-processing system 250.

At step 410, a determination may be made that the confirmation utterance was not spoken. For example, because the first text data and the second text data were determined to be different, this may indicate that the confirmation utterance was not spoken. At step 412, communications system 228, therefore, may cause the communications session to end, as the expected confirmation utterance was not spoken. In some embodiments, process 400, or a portion thereof, may repeat for a given amount of time such that audio received by the initiating device is monitored for that amount of time. For example, if, at step 408, it is determined that the first text data and the second text data are similar, then process 400 may return to step 406, where additional audio data may be received, and additional text data generated from the additional audio data. The additional text data may then be compared with the first text data to determine whether or not the confirmation utterance was spoken. This may allow communications system 228 to monitor the audio received by the initiating device for a certain amount of time to allow the initiating individual the opportunity to speak the confirmation utterance.

Figure 5:
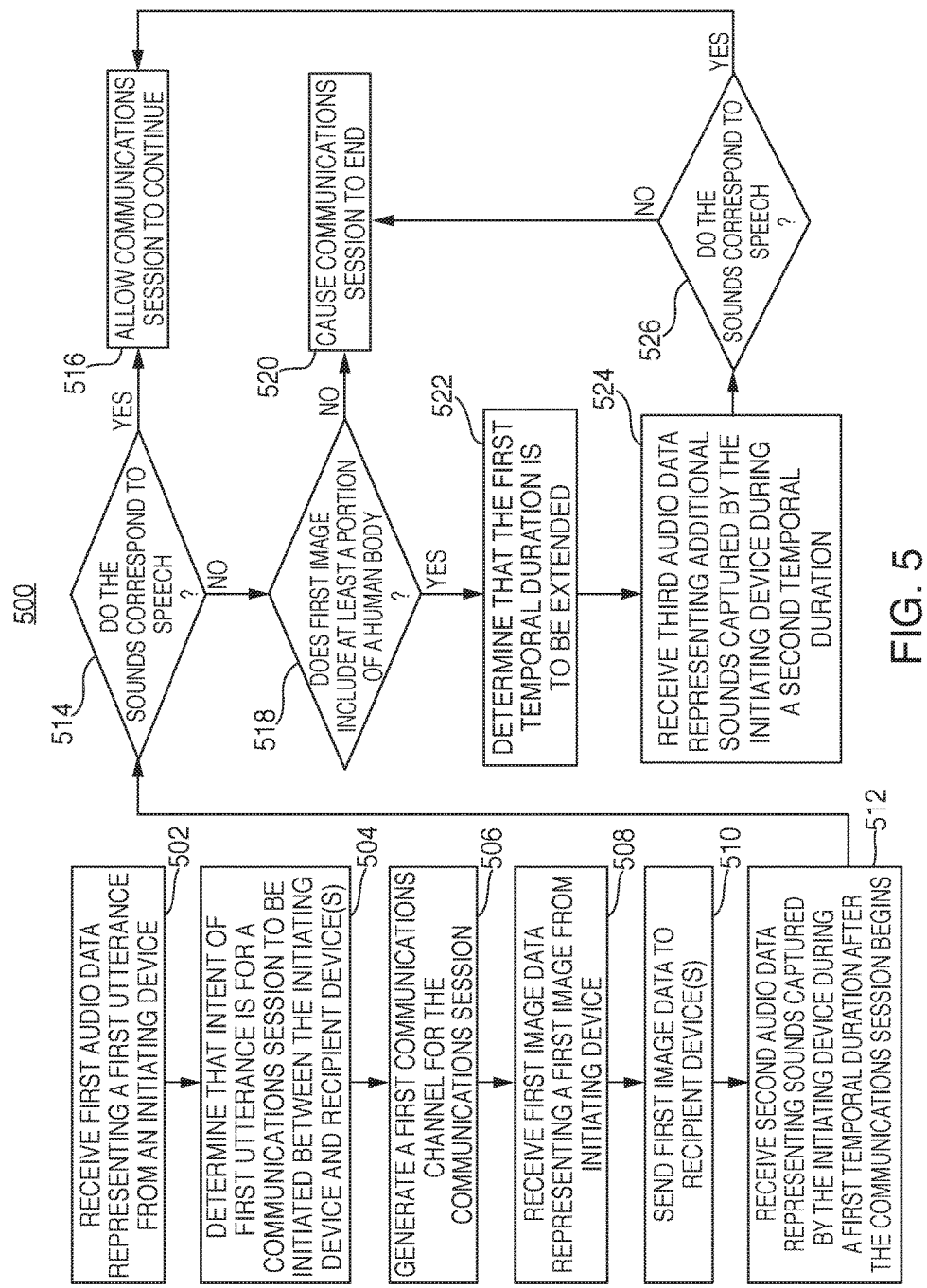
FIG. 5 is an illustrative flowchart of an exemplary process for determining whether to end a communications session based on an absence of presence data for an initiating device, in accordance with various embodiments.

FIG. 5 is an illustrative flowchart of an exemplary process for determining whether to end a communications session based on an absence of presence data for an initiating device, in accordance with various embodiments. In some embodiments, a first request to establish a first communications session with at least a recipient device may be received by a communications system and/or an initiating device. The first communications session may be caused to be established between the initiating device and at least the recipient device. If, during the first communications session, an absence of presence data—such as speech data—associated with the initiating device is determined, then the first communications session may be caused to end.

Process 500, in a non-limiting embodiment, may begin at step 502. At step 502, first audio data representing a first utterance may be received from an initiating device. The first utterance may correspond to a request to initiate a communications session with a recipient device. For example, individual 2 may speak utterance 4 for initiating a communications session with a contact named "John." In response to detecting the wakeword, "Alexa," electronic device 100*a* may begin sending first audio data representing utterance 4 to computing system 200, and in particular speech-processing system 250. At step 504, an intent of the first utterance may be determined. For instance, the intent may be for a communications session to be initiated between the initiating device and one or more recipient devices.

In some embodiments, upon receipt, speech-processing system 250 may generate text data representing the first audio data using ASR module 258, and may then use NLU module 260 to determine an intent of the first utterance. For instance, the intent may be for a communications session to be established between the initiating device and one of a particular contact's devices. In some embodiments, for example, if the contact has multiple devices associated with their user account, then presence tracking system 224 may be accessed to determine which of those devices has recently detected human presence. In this particular scenario, that device may be selected as the targeted recipient device for the communications session. At step 506, a first communications channel may be generated by computing system 200 for facilitating the communications session between the initiating device and the recipient device. In some embodiments, steps 502, 504, and 506 of FIG. 5 may be substantially similar to steps 302-308 of FIG. 3, and the previous descriptions may apply. Furthermore, in some embodiments, a determination may be made prior to generating the first communications channel as to whether or not presence is detected for the recipient device (as well as the initiating device). If presence is not detected (e.g., no humans located nearby the recipient device), then communications system 228 may prevent the communications session from beginning. However, if presence tracking system 224 indicates that presence is detected for the recipient device, then communications system 228 may establish the communications session by generating the first communications channel.

At step 508, first image data indicating that a first image was captured by the initiating device. In one embodiment, the first image data may be received by communications system 228. For example, media system 216 of the initiating device may provide image/video data (as well as, or alternatively, audio data) to a SIP Proxy running on the communications system 228 for facilitating communications between the initiating device and the recipient device. In another embodiment, the first image data may be received by the initiating device, or an additional communications system that the initiating device may be in communication with.

In some embodiments, in response to establishing the communications session, the initiating device may cause camera(s) 214 to start capturing image/video data, and may send that image/video data to communications system 228. At step 510, the first image data may then be sent to the recipient device. For example, the SIP Proxy of communications system 228 may route the first image data to the recipient device using the first communications channel. In some embodiments, steps 508 and 510 of FIG. 5 may be substantially similar to step 310 of FIG. 3, and the previous description may apply.

At step 512, second audio data representing sounds captured by the initiating device during a first temporal duration after the communications session has been established may be received by communications system 228. For example, after the communications session is started, electronic device 100*a* may continue sending audio data representing sounds captured by microphone(s) 208 to computing system 200, and in particular, communications system 228 thereof.

In some embodiments, the audio data may be provided to speech activity detection system 222 for determining whether the sounds correspond to speech or non-speech. However, in persons of ordinary skill in the art will recognize that communications system 228 may be configured to instruct media system 216 of the initiating device to send the second audio data to speech activity detection system 222 in response to the communications session being established, and the aforementioned is merely exemplary. In some embodiments, step 512 of FIG. 5 may be substantially similar to step 314 of FIG. 3, and the previous description may apply. In some embodiments, however, at step 512, generally speaking, first data indicating that the first sounds were received by at least a first microphone of the initiating device during a first amount of time after the communications session was initiated may be received.

At step 514, a determination may be made as to whether or not the sounds correspond to speech. For example, speech activity detection system 222 may analyze the second audio data to determine whether or not the sounds correspond to speech of human origination, speech of non-human origination, noise, or silence. For instance, the first sounds may be determined to correspond to speech. If, at step 514, it is determined that the sounds correspond to speech, for instance using speech activity detection system 222, and in particular speech of human origination, then process 500 may proceed to step 516 where the communications session between the initiating device and the recipient device is allowed to continue. Steps 514 and 516 of FIG. 5, in one embodiment, may be substantially similar to steps 316 and 320 of FIG. 3, and the previous description may apply.

If, however, at step 514, it is determined that the sounds correspond to non-speech (e.g., noise, silence, or speech that is non-human in origin), then process 500 may proceed to step 518. For example, speech activity detection system 222 may determine that the second audio data represents non-speech. At step 518, another determination may be made, this time as to whether or not the first image includes at least a portion of a human body. For instance, an image may be received from the initiating device, and a determination may be made as to whether a portion of the image includes a part, or parts, of a human body. For example, the image data may be received by presence tracking system 224, which may perform various image recognition techniques for identifying whether or not the image includes a portion of the human body. In one example embodiment, identification of human body portions may be determined based on a skin tone of the individual proximate to the initiating device. Using the skin tone, smaller body parts, such as hands and fingers, may be determined which might otherwise be difficult to identify. In some embodiments, functionalities modules 262, in addition to, or in conjunction with, presence tracking system 224, may include one or more techniques or processes for identifying the various human body parts and the location thereof via one or more first party functionalities and/or third party functionalities. The human body part(s) determination can be accomplished through known machine learning techniques (where statistical reasoning is applied to approximate the desired results), such as least squares analysis, or the use of generative and discriminative supervised learning modules. In many of these instances, the presence tracking system 224 may be trained using known images, which can be divided into patches. Features can be extracted from the patches, which can then be used to form a dictionary to compare future results to. However, persons of ordinary skill in the art will recognize that presence tracking system 224 may use any suitable identification technique for identifying a human body part within an image including, but not limited to, motion vector analysis, edge detection, flash exposure, idle image comparison, and/or skin tone analysis. More generally, it may be determined that there is an absence of presence data, where the absence of presence data corresponds to a lack of at least a portion of a human body part being determined to be included within an image captured by one or more image capturing components of the initiating device.

If, at step 518, presence tracking system 224—either alone or in conjunction with one or more additional modules/systems (e.g., functionalities module 262)—determines that the first image does not include at least a portion of a human body, then process 500 may proceed to step 520. At step 520, the communications session between the initiating device and the recipient device may be caused to end. For instance, although speech may have been detected by speech activity detection system 222 from the initiating device, as no human is detected proximate to the initiating device, the speech may correspond to non-human based speech, such as speech originating from a non-human source (e.g., television, radio, internet broadcast). This may indicate that the initiator (e.g., individual 2) is not presently near there device, and therefore may not be actively trying to participate in the communications session. Thus, for this particular scenario, communications system 228 may cause the communications session to end such that the initiator will have to re-initiate a new communications session. For example, communications system 228 may cause the SIP Proxy to instruct media systems 216 of the initiating device and recipient device to no longer send audio/video data, or even more generally, close the SIP Proxy so that no intermediary is available for facilitating communications.

If, at step 518, presence tracking system 224—either alone or in conjunction with one or more additional modules/systems (e.g., functionalities module 262)—determines that the first image does include a portion of a human body, the process 500 may proceed to step 522. At step 522, communications system 228 may determine that the first temporal duration, with which speech activity has been monitored, should be extended. In some embodiments, because human presence is detected proximate to the initiating device but no speech is heard, communications system 228 may extend the amount of time with which speech activity detection system 222 "listens" for speech activity in order to allow the initiator, or anyone else present proximate to the initiating device, to speak. For instance, the individual may have initiated the communications, and merely not said anything immediately, or had some other event transpire with which they needed to address. Therefore, communications system 228 may allow that individual a little additional time in order to speak to preserve the communications session.

At step 524, third audio data representing additional sounds captured by the initiating device during a second temporal duration may be received by communications system 228 and/or speech activity detection system 222. For instance, communications system 228 may route the third audio data to speech activity detection system 222, or may simply cause incoming audio data to be sent directly to speech activity detection system 222. The second temporal duration, in some embodiments, may be any suitable amount of time with which speech activity may be monitored in order to determine whether or not the individual determined to be present near the initiating device may have to speak. For instance, the second temporal duration may be a few seconds, a few minutes, etc. Generally speaking, in one embodiment, second data indicating that second sounds were received by the one or more microphones of the initiating device during a second amount of time after an end of the first amount of time may be received by computing system 200. Using the second data, a second time that the second sounds were received may be determined.

After receiving the third audio data, a determination may be made at step 526 as to whether or not the additional sounds represented by the third audio data correspond to speech. For instance, speech activity detection system 222 may determine, at step 526, whether the additional sounds captured during the second temporal duration are associated with speech, noise, or silence. In some embodiments, step 526 may be substantially similar to step 514, with the exception that at step 526 the determination is made for the third audio data received after at least a portion of a human body is determined to be included within the captured first image from the initiating device. If, at step 526, it is determined that the additional sounds do correspond to speech, the process 500 may proceed to step 516, where the communications session may be allowed to continue. However, if at step 526 it is determined that the additional sounds do not correspond to speech, then process 500 may proceed to step 520, where the communications session may end. For instance, communications system 228 may severe the SIP Proxy facilitating the communications between the initiating device and the recipient device, thereby closing the first communications channel for example, or alternatively, communications system 228 may instruct the initiating device and the recipient device to stop sending communications. In some embodiments, one or more additional steps may be performed (e.g., speaker identification, face recognition, etc.) or one or more steps may be repeated (e.g., capturing a second image and determining whether the same or a different body part is included within the second image), however persons of ordinary skill in the art will recognize that this is merely exemplary.

In some embodiments, at step 526, it may be determined that the second sounds correspond to non-speech. Furthermore, it may be determined that an amount of time between the first time, obtained from the first data, and the second time, obtained from the second data, is greater than or equal to a predefined temporal threshold value. In this particular scenario, it may be determined that the communications session should end based, at least in part, on the first sounds and the second sounds corresponding to non-speech, and the amount of time between the first time and the second time being greater than the predefined temporal threshold value. In this case, the communications session may be caused to end (e.g., step 520). However, if the second sounds are determined to correspond to speech, and/or if the amount of time is less than or equal to the predefined temporal threshold value, then the communications system may continue (e.g., step 516).

Figure 6:
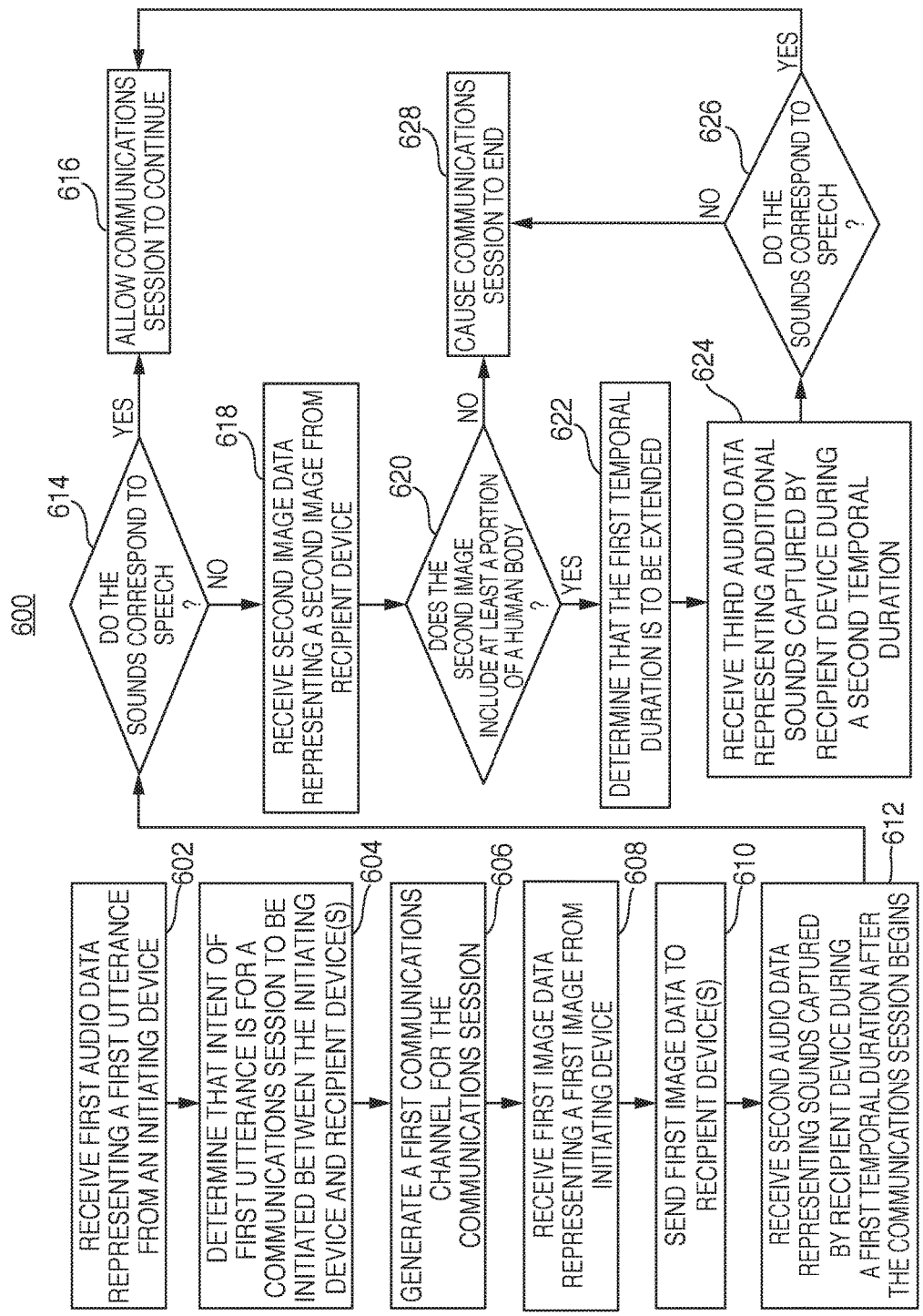
FIG. 6 is an illustrative flowchart of an exemplary process for determining to end a communications session based on an absence of presence data for a recipient device, in accordance with various embodiments.

FIG. 6 is an illustrative flowchart of an exemplary process for determining to end a communications session based on an absence of presence data for a recipient device, in accordance with various embodiments. In some embodiments, a first request to establish a first communications session with at least one recipient device may be received. For instance, a communications system (e.g., communications system 228) and/or an initiating device may receive the request. First presence data may be received from the recipient device and, based at least in part on the first presence data indicating human presence proximate to the recipient device, the first communications may be caused to be established between an initiating device and the one or more recipient devices. During the first communications session, it may be determined that there is an absence of speech data received from the recipient device. In response, the first communications session may be caused to end.

Process 600, in a non-limiting embodiment, may begin at step 602. At step 602, first audio data representing a first utterance may be received from an initiating device. At step 604, an intent of the first utterance may be determined, where the intent is for a communications session to be initiated between the initiating device and a recipient device. At step 606, a first communications channel may be generated for the communications session. At step 608, first image data representing a first image may be received from the initiating device. At step 610, the first image data may be sent to the recipient device. In some embodiments, steps 602-610 of FIG. 6 may be substantially similar to steps 502-510 of FIG. 5, and the previous descriptions may apply.

At step 612, second audio data representing sounds captured by the recipient device during a first amount of time after the communications session is established may be received by speech activity detection system 222. In one embodiment, first data indicating that first sounds were received by a first microphone, or microphones, of the recipient device during a first amount of time after the first communications session was initiated may be received. For example, the first data may be received by communications system 228, or the first data may be received by the recipient device and/or the initiating device, and persons of ordinary skill in the art will recognize that the aforementioned is merely exemplary. Furthermore, based on the first data, a first time that the first sounds were received by the first microphone(s) may be determined.

At step 614, a determination may be made as to whether or not the sounds represented by the second audio data correspond to speech. In some embodiments, steps 612 and 614 of FIG. 6 may be substantially similar to steps 158 and 160 of FIG. 1, and the previous descriptions may apply. If, at step 614, speech activity detection system 222 determines that the sounds do correspond to speech, and in particular speech of human origin, then process 600 may proceed to step 616. At step 616, the communications session between the initiating device and the recipient device may be allowed to continue, as the recipient is likely speaking in response to the communications session beginning. This may indicate, for instance, that the recipient is aware of the communications session.

If, at step 612, speech activity detection system 222 determines that the sounds do not correspond to speech, or speech that is non-human in origin, then process 600 may proceed to step 618. For example, the first sounds may be determined to correspond to non-speech at step 612. At step 618, second image data representing a second image may be received by communications system 228 and/or presence tracking system 224 from the recipient device. For example, after the communications session is established, communications system 228 may cause the recipient device to begin capturing image/video data using one or more of its cameras (e.g., camera(s) 208), and also to send that captured image/video data to communications system 228 and/or presence tracking system 224. In some embodiments, the second image/video data may correspond to images/videos taken at various temporal intervals after the communications session begins, such as separate shots, or a continuous video, however this is merely exemplary. Upon receiving the second image data, in one embodiment, communications system 228 may provide the second image data to presence tracking system 224. In some embodiments, the second image data may not be provided to the initiating device, as a determination may be made first in order to determine whether any individuals are located proximate to the recipient device. For instance, the SIP Proxy running on communications system 228 may delay providing the second image data to the initiating device.

At step 620, a determination may be made as to whether or not the second image includes at least a portion of a human body. In some embodiments, step 620 of FIG. 6 may be substantially similar to step 518 of FIG. 5, with the exception that step 620 corresponds to second image data received from the recipient device. If, at step 620, presence tracking system 224 determines that the second image does not includes at least portion of a human body, then process 600 may proceed to step 628. Still further, in some embodiments, data indicating that a first image was captured by one or more image capturing components of the recipient device may be received. Using this data, a determination may be made as to whether or not the one or more images include at least a portion of a human body part.

At step 628, communications system 228 may cause the communications session between the initiating device and the recipient device to end. For instance, because both speech and presence are not detected by the recipient device after the communications session begins, communications system 228 may determine that no individuals are present proximate to the recipient device, and therefore no one is available on the recipient side to communicate with the initiating device. The communications session may be caused to end so that the initiator is not capable of having a live video/audio feed into the recipient's household as the recipient may not presently be home, or otherwise available/aware, to participate in the communications session. In one embodiment, communications system 228 may end the communications session by instructing media systems 216 of the initiating and receiving devices to stop sending audio/video data to communications systems 228. As another embodiment, communications system 228 may cause the SIP Proxy facilitating the communications session to end, such that the first communications channel is closed.

If, however, at step 620, presence tracking system 224 determines that the second image includes at least a portion of a human body, then process 600 may proceed to step 622. At step 622, a determination may be made that the first temporal duration with which audio is captured by the recipient device to determine speech activity is to be extended. For instance, step 622 of FIG. 6 may be substantially similar to step 522 of FIG. 5, with the exception that step 622 corresponds to the first temporal duration being extended for monitoring speech activity by the recipient device, as opposed to the initiating device.

At step 624, third audio data representing additional sounds captured by the recipient device during a second temporal duration may be received by communications system 228, and in particular by speech activity detection system 222. At step 626, another determination may be made as to whether or not those additional sounds correspond to speech, and in particular speech originating from a human source. If so, then process 600 may proceed to step 616, where the communications session is allowed to continue. For instance, this may correspond to a scenario where the recipient device may not have spoken initially in response to the communications session starting, but then after a brief amount of time, that individual becomes present within the area where the recipient device is, and starts speaking thereafter. If, however, at step 626, speech activity detection system 222 determines that the additional sounds do not correspond to speech, or they correspond to speech originating from a non-human source (e.g., a television, radio, etc.), then process 600 may proceed to step 628, where the communications session is ended. In some embodiments, steps 624 and 626 of FIG. 6 may be substantially similar to steps 524 and 526 of FIG. 5, with the exception that steps 624 and 626 correspond to speech activity detection being determined for audio data originating from the recipient device. Persons of ordinary skill in the art will recognize that some or all of processes 500 and 600 may be performed separately or together such that speech activity detection and image recognition functionality are performed for both the initiating device and/or the recipient device, and the separation of processes 500 and 600 is merely illustrative.

In some embodiments, at step 624, second data indicating that second sounds were received by the first microphone(s) during a second amount of time after an end of the first amount of time may be received. For example, communications system 228, the recipient device, and/or the initiating device may receive the second data. Using the second data, a second time that the second sounds were received by the microphone(s) may be determined. Furthermore, it may be determined that the second sounds correspond to non-speech. An amount of time between the first time and the second time may be determined, and that amount of time may be determined to be greater than a predefined temporal threshold value. Based, at least in part, on the first and second sounds corresponding to non-speech, and the amount of time being greater than the predefined temporal threshold value, the first communications session may be caused to end (e.g., step 628). If, however, the first or second sounds are determined to correspond to speech, and/or the amount of time is less than or equal to the predefined temporal threshold value, then the first communications session may be caused to continue (e.g., step 616).

Figure 7:
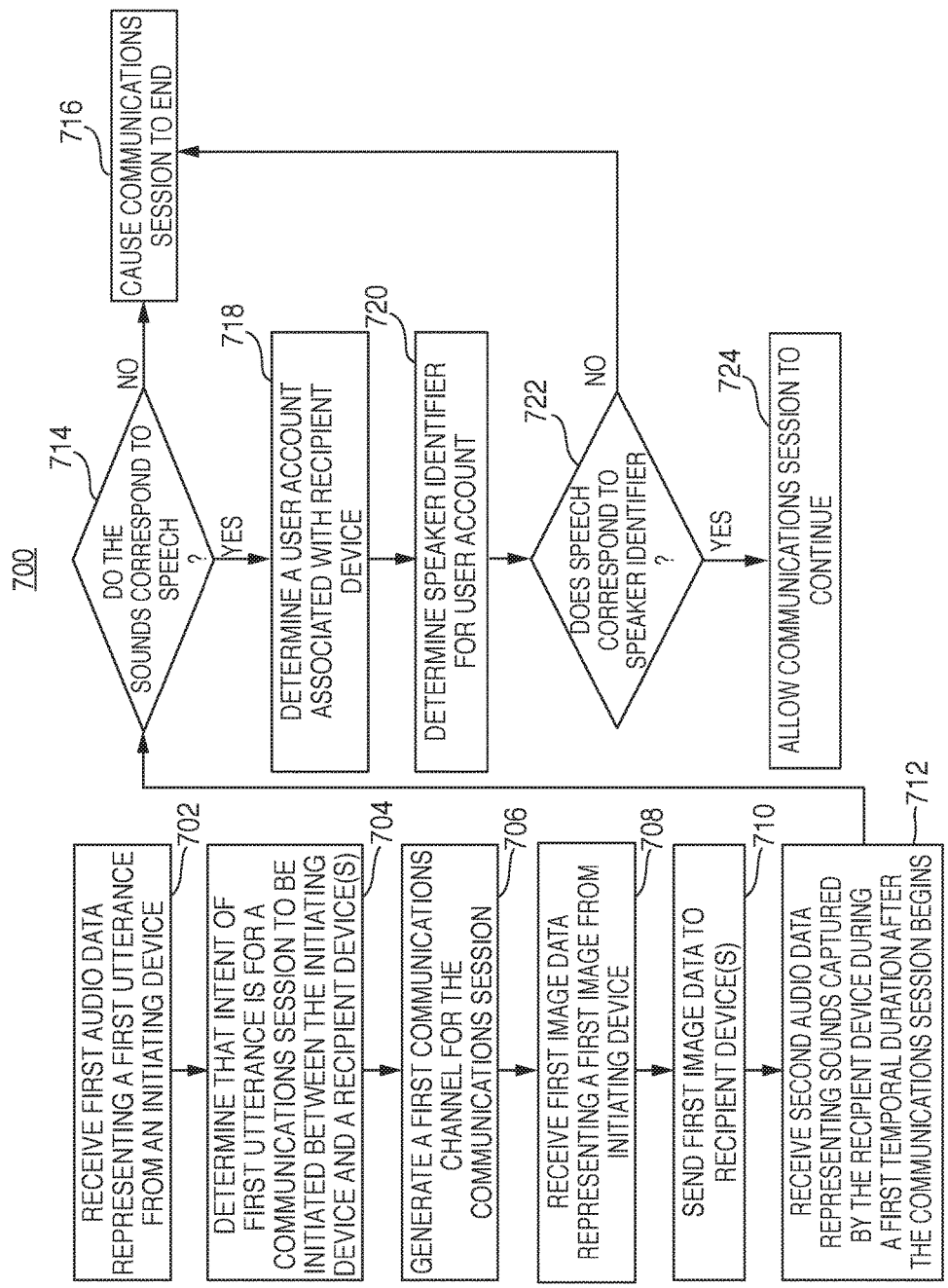
FIG. 7 is an illustrative flowchart of an exemplary process for determining whether a communications session should be ended based on speech activity and speaker identification by a recipient device, in accordance with various embodiments.

FIG. 7 is an illustrative flowchart of an exemplary process for determining whether a communications session should be ended based on speech activity and speaker identification by a recipient device, in accordance with various embodiments. Process 700, in a non-limiting embodiment, may begin at step 702. At step 702, first audio data representing a first utterance may be received from an initiating device. At step 704, an intent of the first utterance may be determined, where the intent is for a communications session to be initiated between the initiating device and a recipient device. At step 706, a first communications channel may be generated for the communications session. At step 708, first image data representing a first image may be received from the initiating device. At step 710, the first image data may be sent to the recipient device, and at step 712, second audio data representing sounds captured by the recipient device during a first temporal duration after the communications session begins may be received. In some embodiments, steps 702-712 of FIG. 7 may be substantially similar to steps 602-612 of FIG. 6, and the previous descriptions may apply.

At step 714, a determination may be made as to whether or not the sounds represented by the second audio data correspond to speech. For instance, speech activity detection system 222 may analyze the second audio data to determine whether the sounds correspond to speech or non-speech. In some embodiments, step 714 of FIG. 7 may be substantially similar to step 614 of FIG. 6, and the previous description may apply. If, at step 714, speech activity detection system 222 determines that the sounds do not correspond to speech, then process 700 may proceed to step 716. At step 716, computing system 200 may cause the communications session to end. For example, if speech activity detection system 222 determines that the sounds correspond to noise or silence (e.g., the second audio data represents silence), then that may indicate that no one is speaking near, or substantially near, to the recipient device, and therefore the communications session should end so that the initiating device is not capable of having an open video/audio feed into the recipient's household.

If, however, at step 714, speech activity detection system 222 determines that the sounds do correspond to speech, then process 700 may proceed to step 718. At step 718, a user account associated with the recipient device may be determined. Upon the communications session being initiated, a device identifier associated with the recipient device may be known by communications system 228 in order to appropriately route the first image data (as well as audio data) from the initiating device to the recipient device. After determining the device identifier (e.g., a MAC address, IP address, serial number, etc.) for the recipient device, communications system 228 may determine a user account, stored by user accounts module 268, that is associated with that device identifier, and thus associated with the recipient device. In some embodiments, the user account associated with the recipient device may be determined with the intent of the utterance. For example, utterance 4 may have the format "{Wakeword}, {Establish Communications Session Phrase} {Contact Name}." In this particular scenario, the object {Contact Name} may correspond to the name "John," and the user account associated with that contact name, as stored within the initiator's user account, may be determined.

At step 720, a speaker identifier for the user account associated with the recipient device may be determined. The speaker identifier may, in some embodiments, correspond to voice biometric data, which may indicate a voice signal associated with one or more user profiles linked to the determined user account. Voice biometric data may include any suitable type of information including, but not limited to, a frequency pattern/range for an individual, an intonation for the individual, a pitch of the individual, an accent or style of speaking of the individual, and the like. Generally, the voice biometric data includes to a voiceprint for a particular individual. A voiceprint corresponds to a graphical representation of an individual's voice, which may indicate various component frequencies of a person's voice represented by a sound spectrograph.

At step 722, a determination may be made as to whether or not the speech corresponds to the speaker identifier. In some embodiments, speaker identification system 226 may receive the second audio data and may compare the second audio data to the speaker identifier. For instance, a Fast Fourier Transform ("FFT") may be applied to the second audio data to obtain a frequency representation of the sounds, which may then be analyzed against a reference spectrograph of the stored voice signal for the user account. Speaker identification system 226 may then determine whether a difference between the frequency representation of the sounds and the reference spectrograph is greater than a predefined threshold difference. If, at step 722, speaker identification system 226 determines that the speech does correspond to the speaker identifier stored for the user account then process 700 may proceed to step 724 where the communications session is allowed to continue. However, if at step 722 speaker identification system 226 determines that the speech does not correspond to the speaker identifier, then process 700 may proceed to step 716, where the communications session is ended.

Step 722 may, in some embodiments, allow communications system 228 to determine whether sounds received by the recipient device correspond to speech originating from a human source or a non-human source. For example, if a television or radio is playing in the recipient's household within earshot of the recipient device, the sounds captured by the recipient device may correspond to speech. However, this speech (e.g., from a television or radio) does not correspond to a human who is actually participating in the communications session. In some embodiments, speaker identification system 226 may capable of identifying that the speech does not correspond to a known speaker ID associated with the recipient device, and therefore may cause the communication session to end as no individual is likely speaking during the first temporal duration. Persons of ordinary skill in the art will recognize that a similar process may be employed for ending communications session based on speech activity and speaker identification for an initiating device.

Figure 8:
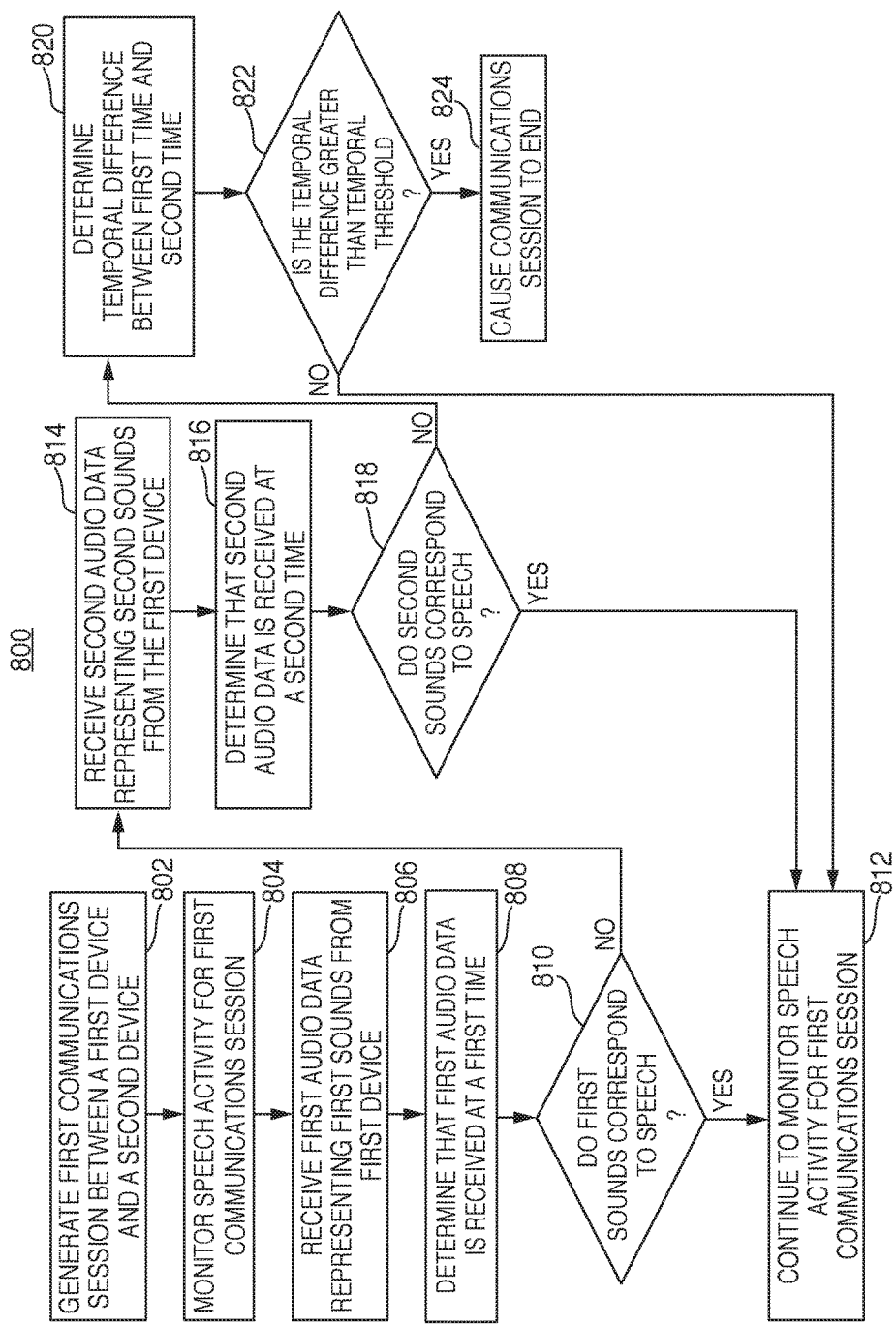
FIG. 8 is an illustrative flowchart of an exemplary process for determining to end a communications session based on an absence of presence data received by an initiating device and a recipient device during the communications session, in accordance with various embodiments.

FIG. 8 is an illustrative flowchart of an exemplary process for determining to end a communications session based on an absence of presence data received by an initiating device and/or a recipient device during the communications session, in accordance with various embodiments. In some embodiments, during a first communications session between a first device and at least a second device, it may be determined that there is a first absence of presence data being received by the first device. The first absence of presence data may be determined to occur for a first amount of time. Furthermore, during the first communications session, it may be determined that a second absence of presence data being received by the second device, where the second absence of presence data may be determined to occur for a second amount of time. If the first amount of time and the second amount of time are both greater than or equal to a threshold amount of time, then this may cause the first communications session to end.

Process 800, in a non-limiting embodiment, may begin at step 802. At step 802, a first communications session may be generated between a first device and a second device. For example, in response to an individual establishing a communications session using their device, a communications channel may be generated such that the initiating device and the recipient device's communications may be facilitated. In some embodiments, the communications session may include video communications and/or audio communications. Furthermore, one or more steps of processes 300, 400, 500, 600, and 700 may be occur prior to step 802 and/or in conjunction with one or more steps of process 800, however this is merely exemplary.

At step 804, speech activity occurring during the first communications session may be monitored. For instance, as the communications session progresses between the first device and the second device, audio data may be sent from one device to another. For example, electronic devices 100a and 100b of FIG. 1 may be in a communications session with one another, where individual 2 speaks additional utterances to electronic device 100a, and audio data representing those additional utterances are routed to electronic device 100b via communications system 228. Similarly, another individual associated with electronic device 100b may speak, and audio data representing that individual's utterances may be routed to electronic device 100a via communications system 228. This activity (e.g., audio data being sent/received from the devices participating in the communications session) may be monitored by communications system 228, an in particular speech activity detection system 222, as all of the communications may be facilitated by a SIP Proxy running on communications system 228. In some embodiments, the initiating individual and the recipient individual may communicate video and/or audio communications with one another while participating in the first communications session. For example, a first individual and a second individual may conduct a video communication with one another. In some embodiments, however, speech activity may be analyzed locally on either devices, and data indicating of whether or not speech was received by these devices may be received.

At step 806, first audio data representing first sounds may be received from the first device. In this particular scenario, the first device may correspond to the initiating device or the recipient device. For example, the first audio data may correspond to sounds captured by microphone(s) 208 of electronic device 100a, or sounds captured by microphone(s) 208 of electronic device 100b.

At step 808, a first time that the first audio data is received by communications system 228, and in particular speech activity detection system 222, may be determined. For example, in addition to receiving the first audio data from the first device, first temporal metadata may be received indicating a first time that the first audio data was received by speech activity detection system 222. The first temporal metadata may, alternatively, indicate a first time that the first audio data was sent by the first device to communications system 228 for being routed to the second device. Still further, the first temporal metadata may indicate a first time that the sounds were captured by microphone(s) 208. For example, media system 216 may generate the first temporal metadata as a header for the audio data sent to a SIP Proxy facilitating the communications for communications system 228.

At step 810, a determination may be made as to whether or not the first sounds correspond to speech. For example, speech activity detection system 222 may determine whether or not the first sounds correspond to speech, noise, or silence. In some embodiments, the determination of step 810 may also include determining whether or not the sounds correspond to speech originating from a human source or a non-human source. For example, if the first sounds are determined to represent speech, speech activity detection system 222 may provide the results to speaker identification system 226, which may determine whether or not the speech corresponds to a speaker identifier (e.g., a voice signal) associated with the first device's user account. If so, then the first sounds may be said as being speech, whereas if the first sounds do not correspond to the speaker identifier, then the first sounds may be said to be non-speech (e.g., speech originating from a non-human source).

In some embodiments, however, first data indicating that first sounds were received by a first microphone of the initiating device may be received, as opposed to the first audio data being received. For instance, the first data may indicate whether the first sounds corresponded to speech, or corresponded to non-speech. In some embodiments, the first sounds may correspond to speech captured during the first communications session. For example, after a communications session is initiated, an individual associated with the initiating device may speaker. In one embodiment, second data indicating that second sounds were received by the first microphone of the initiating device may also be received during a first amount of time after a temporal end of the speech. In this particular scenario, the second sounds may be determined to correspond to non-speech. The determination that the first sounds and the second sounds correspond to speech and non-speech, respectively, may occur on the initiating device (e.g., a speech activity detection system resident on the initiating device), or on another device that the initiating device is in communication with (e.g., a communications device). This may differ from the previously mentioned steps in that the speech activity detection functionality may be performed locally, whereas in steps 806-810 the speech activity detection functionality may be performed by a computing system, such as computing system 200. However, persons of ordinary skill in the art will recognize that any of the aforementioned options may be employed, and the use of one or another is merely exemplary.

If at step 810, it is determined that the first sounds represented by the first audio data of step 806 do correspond to speech, then process 800 may continue to step 812. At step 812, the speech activity for the first communications session may continue to be monitored. In some embodiments, this may correspond to performing additional period checks on audio data obtained from either the first device or the second device in order to determine whether the sounds represented by that audio data correspond to speech or not speech. For instance, steps 804-810 may repeat such that speech activity detection system 222 continually monitors local audio captured by the first device and/or the second device in order to determine whether speech has ceased to be present for one or more devices for more than a predefined amount of time.

If, however, at step 810, speech activity detection system 222 determines that the first sounds do not correspond to speech, the process 800 may proceed to step 814. At step 814, second audio data representing second sounds may be received from the first device. For example, the second audio data may correspond to sounds captured by microphone(s) 208 of electronic device 100a, or sounds captured by microphone(s) 208 of electronic device 100b. At step 816, a second time that the second audio data is received by communications system 228, and in particular speech activity detection system 222, may be determined. For example, in addition to receiving the second audio data from the first device, second temporal metadata may be received indicating a second time that the second audio data was received by speech activity detection system 222. The second temporal metadata may, alternatively, indicate a second time that the second audio data was sent by the first device to computing system 200. Still further, the second temporal metadata may indicate a second time that the sounds were captured by microphone(s) 208.

At step 818, a determination may be made as to whether the second sounds correspond to speech. For example, speech activity detection system 222 may determine whether or not the second sounds correspond to speech, noise, or silence. In some embodiments, the determination of step 818 may also include determining whether or not the second sounds correspond to speech originating from a human source or a non-human source. In some embodiments, steps 814, 816, and 818 may be substantially similar to steps 804, 806, and 808, with the exception that steps 814, 816, and 818 correspond to second audio data representing second sounds received by the first device. Persons of ordinary skill in the art will further recognize that steps 806-810 and steps 814-818 may, in some embodiments, be performed at a substantially same time such that speech activity for both the first device and the second device occurs substantially in parallel, and the aforementioned is merely illustrative.

In some embodiments, however, third data indicating that third sounds were received by a second microphone of the recipient device may also be received during a second amount of time after a temporal end of the speech. In this particular scenario, the third sounds may be determined to correspond to non-speech. The determination that the third sounds correspond to non-speech may occur on the recipient device (e.g., a speech activity detection system resident on the recipient device), or on another device that the recipient device is in communication with (e.g., a communications device). This may differ from the previously mentioned steps in that the speech activity detection functionality may be performed locally, whereas in steps 814-818 the speech activity detection functionality may be performed by a computing system, such as computing system 200. However, persons of ordinary skill in the art will recognize that any of the aforementioned options may be employed, and the use of one or another is merely exemplary.

If, at step 818, speech activity detection system 222 determines that the second sounds correspond to speech then process 800 may proceed to step 812. However, if at step 818 speech activity detection system 222 determines that the second sounds do not correspond to speech, then process 800 may proceed to step 820. At step 820, a temporal difference between the first time and the second time may be determined. For instance, if the first time is time $t_1$ and the second time is time $t_2$, the temporal difference would be $|t_1-t_2|$. At step 822, a determination may be made as to whether or not the temporal difference is greater than, or equal to, a predefined temporal threshold. In some embodiments, the predefined temporal threshold may be set by an individual operating the first device or the second device, however this is merely exemplary. As an illustrative example, the predefined temporal threshold may be a few minutes in duration (e.g., three to five minutes). However, persons of ordinary skill in the art will recognize that any suitable temporal duration may be employed.

If, at step 822, it is determined that the temporal difference is greater than the predefined temporal threshold, then process 800 may proceed to step 824, where the first communications session is ended. For example, speech activity detection system 222 may determine that, because no speech has been detected by the first device for more than the predefined amount of time, this may indicate that an individual associated with the first device is no longer present, and therefore the communications session is to end so as to not provide any individual's associated with the second device the ability to listen and/or see into the household associated with the first device. However, if at step 822 speech activity detection system 222 determines that the temporal difference is less than the predefined temporal threshold, then process 800 may proceed to step 812. In this particular scenario, speech activity may continue to be monitored to determine whether or not the detected speech continues to occur.

In some embodiments, however, where the second data indicates that second sounds corresponding to non-speech were received by the initiating device, during a first amount of time after the temporal end of speech during the communications session, it may be determined that the first amount of time is greater than a predefined threshold amount of time. Similarly, where the third data indicates that third sounds corresponding to non-speech were received by the recipient device during a second amount of time after the temporal end of speech during the communications session, it may be determined that the second amount of time is also greater than the predefined threshold amount of time. In this particular scenario, it may be determined that the communications session is to end based, at least in part, on the second sounds and the third sounds corresponding to non-speech, which followed the first sounds corresponding to speech, as well as the first amount of time and the second amount of time be greater than the predefined threshold amount of time after the temporal end of the speech. Thereafter, the communications session may be caused to end.

Figure 9:
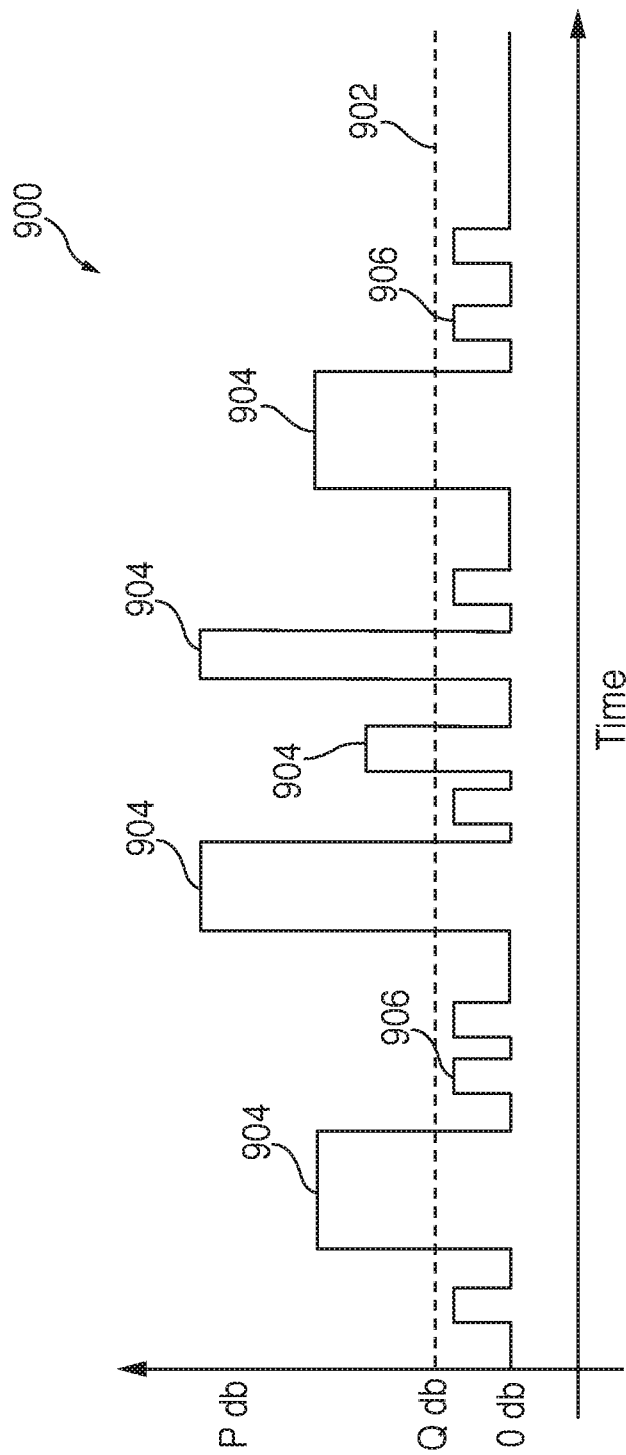
FIG. 9 is an illustrative diagram of an exemplary audio signal for determining whether speech has been detected, in accordance with various embodiments.

FIG. 9 is an illustrative diagram of an exemplary audio signal for determining whether speech has been detected, in accordance with various embodiments. Graph 900 is a graphical depiction of an exemplary audio signal including portions of speech and non-speech activity. As seen within graph 900, the audio signal changes in intensity over time. While the intensity is shown as being in units of decibels ("dBs"), persons of ordinary skill in the art will recognize that this is merely exemplary.

Threshold 902 corresponds to a particular decibel threshold value with which a portion of an audio signal may be classified as corresponding to speech or non-speech. For example, portions 904 may represent portions of the audio signal corresponding to speech, whereas portions 906 may represent portions of the audio signal corresponding to non-speech. The audio signal represented by graph 900 may include sounds of three differing types. For instance, portions 908 may correspond to silence, as these portions are less than threshold 902, and have a decibel level of zero (e.g., 0 dB). Portions 906 may correspond to noise (e.g., background noise), as these portions are greater than zero decibels but less than threshold 902 (e.g., Q dB). Portions 904 may correspond to speech, or more generally sounds that exceed noise threshold 902, as these portions are greater than threshold 902 (e.g., P dB).

Figure 10:
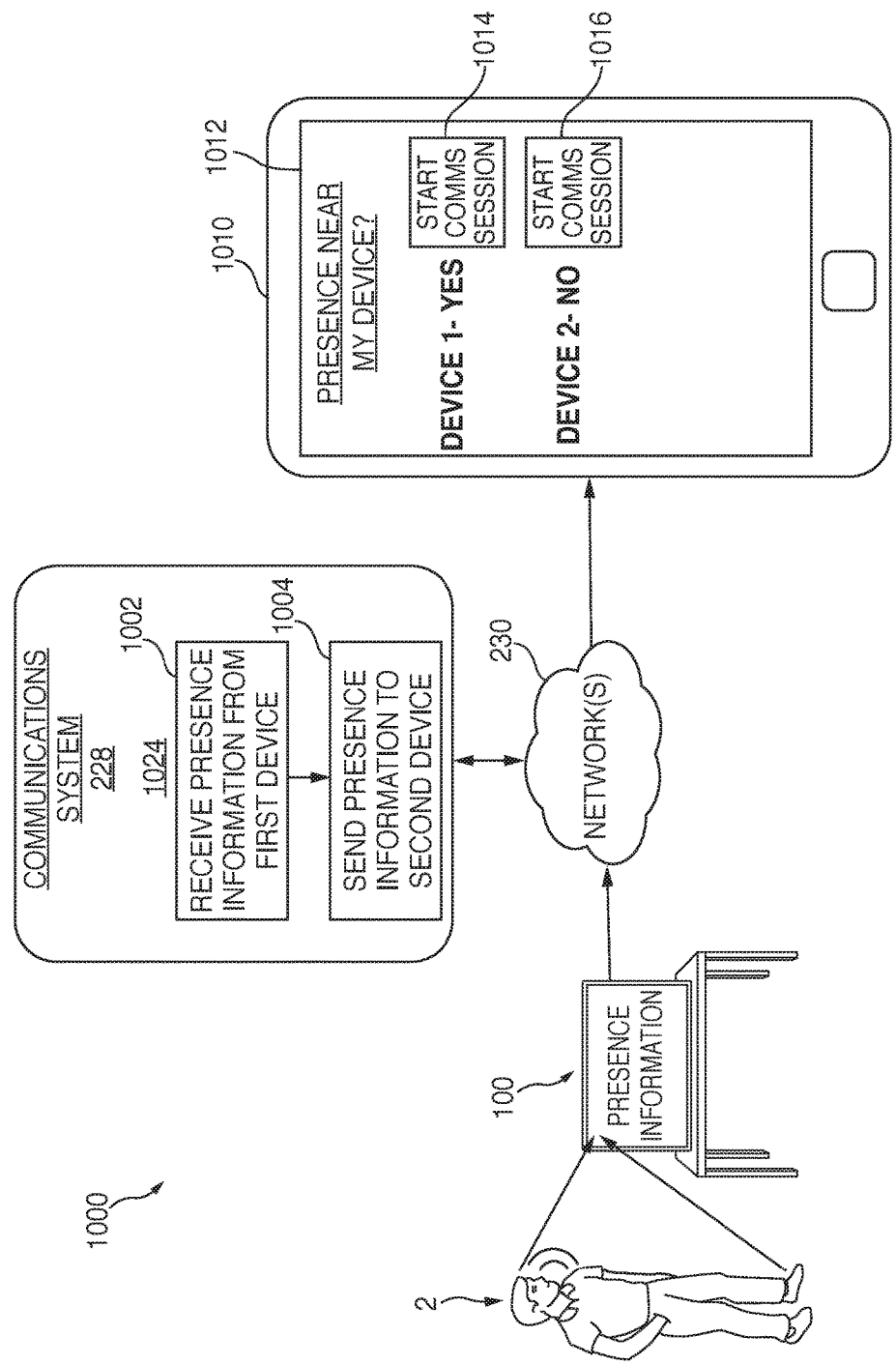
FIG. 10 is an illustrative diagram of an exemplary system for informing a first device of presence information associated with a second device, in accordance with various embodiments.

FIG. 10 is an illustrative diagram of an exemplary system for informing a first device of presence information associated with a second device, in accordance with various embodiments. System 1000 may include individual 2, who may be located physically proximate to electronic device 100. In some embodiments, as described above, electronic device 100 may include one or more presence tracking systems or components that allow electronic device 100 to continually monitor when and if an individual is located nearby. For example, electronic device 100 may use one or more IR sensors/emitters to determine whether or not an object, such as a human, is located nearby. In some embodiments, electronic device 100 may continually track presence information, and may provide that presence information to communications system 228 and/or presence tracking system 224 via network 230. For example, electronic device 100 may determine a presence status at periodic temporal intervals (e.g., every 1-5 milliseconds), and may send presence information indicating the presence status at each temporal interval to presence tracking system 224. In some embodiments, the presence information may be sent to communications system 228, which in turn may provide the presence information to presence tracking system 224. Presence tracking system 224 may, in some embodiments, store the presence information and/or work in conjunction with user accounts module 268 to build a presence profile associated with the various individuals and devices associated with each user account.

In some embodiments, the presence information may be provided to an additional user device associated with a user account, such as a user account associated with electronic device 100. For example, user device 1010 and electronic device 100 may both be associated with a same user account. This may allow user device 1010 to continually monitor, track, and be aware of the presence status associated with one or more devices located within their household. As another example, user device 1010 may be associated with a first user account, and electronic device 100 may be associated with a second user account, where the second user account has granted permissions to devices associated with the first user account to establish communications sessions therewith.

In the illustrative embodiment, communications system 228, and in particular presence tracking system 224, may perform process 1024. At step 1002, presence information may be received from a first device. For example, presence information may be received by presence tracking system 224 from electronic device 100. As mentioned previously, electronic device 100 may continually determine a presence status—such as whether or not any individuals are currently located proximate to electronic device 100—and may send presence information indicating the presence status at each temporal interval to communications system 228 and/or presence tracking system 224 (both of which may be part of, or in communication with, computing system 200). The frequency with which electronic device 100 obtains a presence status may vary depending on the configuration settings of electronic device. For example, electronic device 100 may be configured to obtain a presence status every few milliseconds. In this particular scenario, the presence information indicating the presence status may be sent to presence tracking system 224 every few milliseconds as well, or the presence information may be compiled for a longer period of time and then sent. In the latter case, for instance, presence information indicating presence statuses over the course of multiple temporal intervals (e.g., a few minutes), may then be sent to presence tracking system 224 from electronic device 100, or from communications system 228 upon receipt from electronic device 100.

At step 1004, the presence information may be sent to a second device, where the second device. In some embodiments, the second device may also be associated with a same user account as electronic device 100. For example, user device 1010 may be another device associated with a same user account as that of electronic device 100. User device 1010 and electronic device 100 may, in some embodiments, be substantially similar to one another, and the previous descriptions of electronic device 100 may also apply to user device 1010. However, in some embodiments, the second device may be associated with a different user account then that of the first device. For example, the second device may be associated with a user account of a trusted friend or family member with which an individual of the first device's user account has granted permission to establish communications sessions with.

In the exemplary embodiment, user device 1010 may include a graphical user interface ("GUI") 1012 displayed on a display screen, such as display screen 212. For instance, GUI 1012 may be associated with a particular client application running on user device 1010 that allows an individual operating user device 1010 to view presence information associated with one or more devices associated with their user account. For example, GUI 1012 may indicate presence information associated with a first device (e.g., device 100), and a second device. As an illustrative example, electronic device 100 may correspond to the first device, which may be located in a first room within a household, and a second device (not shown) may be located within a second room within the household. Thus, an individual viewing GUI 1012 may be able to receive presence information relating to both of their devices within the household to determine whether or not anyone is currently located proximate to those devices. If so, the user operating user device 1010 may be able to initiate a communications session with one of those devices using options 1014 and/or 1016.

As an illustrative example, electronic device 100 may determine that individual 2 is currently located proximate thereto. Electronic device 100 may send presence information indicating that individual 2 is located nearby electronic device 100 to communications system 228, and in particular, presence tracking system 224. Presence tracking system 224 may then determine a user account that is associated with electronic device 100, and may send the presence information to one or more additional devices associated with that user account, or authorized to receive the presence information, such as user device 1010. User device 1010 may then display GUI 1012 on its display screen such that an individual operating user device 1010 is capable of seeing that someone (e.g., individual 2) is currently located nearby electronic device 100. In some embodiments, the individual operating user device 1010 may start a communications session with electronic device 100 by pressing option 1014 displayed on GUI 1012, which may allow that individual to start a communications session with electronic device 100, and in particular, individual 2 located nearby.

Figure 11:
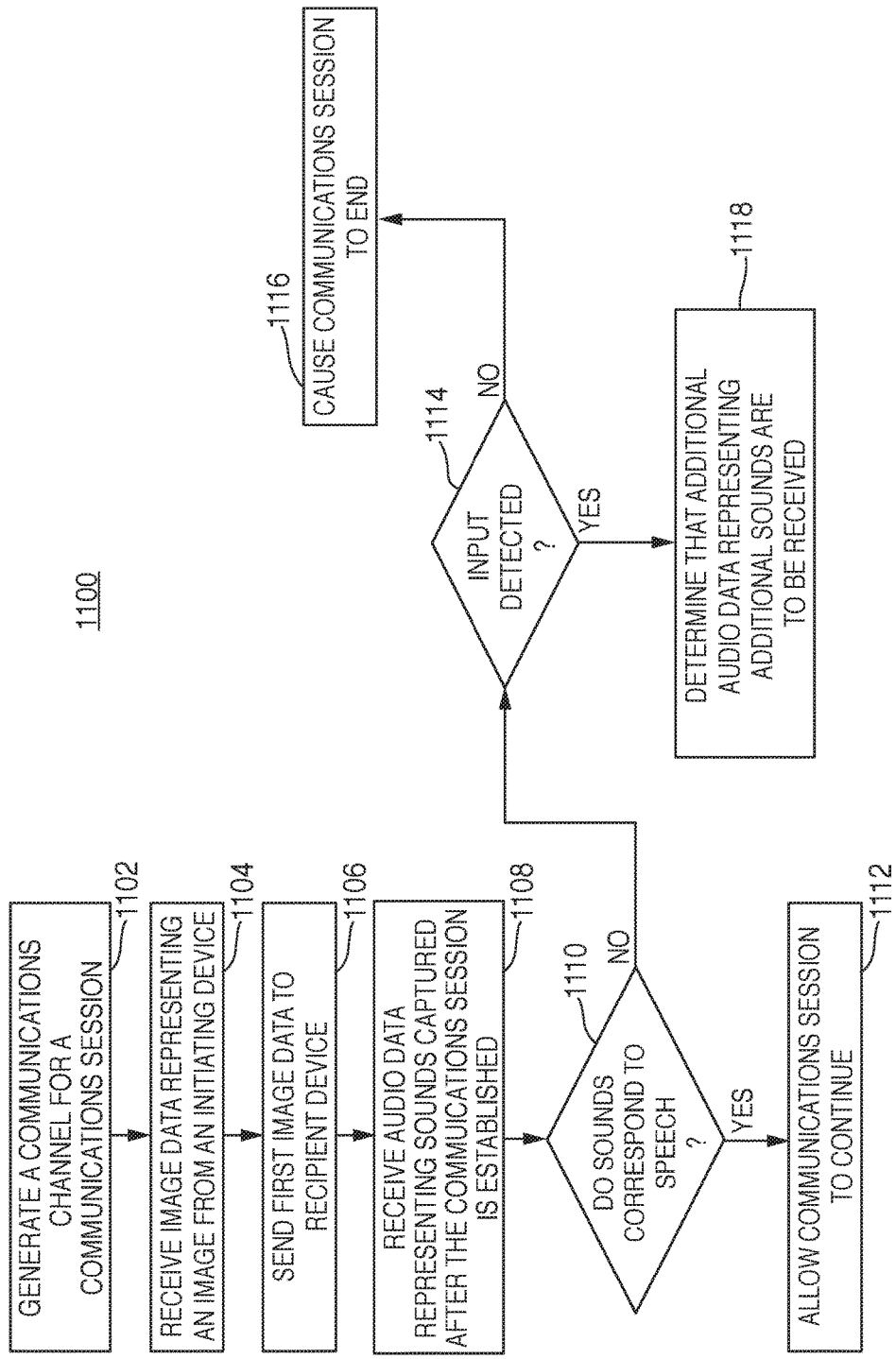
FIG. 11 is an illustrative flowchart of an exemplary process for determining whether a communications session should end based on speech activity, presence information, and inputs being detected, in accordance with various embodiments.

FIG. 11 is an illustrative flowchart of an exemplary process for determining whether a communications session should end based on speech activity, presence information, and inputs being detected, in accordance with various embodiments. In one non-limiting embodiment, process 1100 may begin at step 1102. At step 1102, a communications channel may be generated for a communications session. For example, in response to an individual speaking an utterance to establish a communications session with another individual's electronic device, communications system 228 may determine whether or not that individual's electronic device detects presence proximate the device. If presence is detected, then communications system 228 may generate the communications channel for the communications session. For example, communications system 228 may generate a SIP Proxy for a VoIP communications session between a first device and a second device (e.g., electronic devices 100a, 100b).

At step 1104, image data representing an image obtained by one or more image capturing components of an initiating device (e.g., the device that initiated the communications session) may be received by communications system 228. At step 1106, the first image data may be sent to the recipient device. Steps 1102, 1104, and 1106 of FIG. 11, in one embodiment, may be substantially similar to steps 706, 708, and 710, respectively, of FIG. 7, and the previous description may apply.

At step 1108, audio data representing sounds captured after the communications session has been established may be received by communications system 228. In one embodiment, the audio data is received from the initiating device, however this is exemplary, and the audio data alternatively may be received from the recipient device. Therefore, step 1108 may be substantially similar to step 512 of FIG. 5, and/or step 612 of FIG. 6, and the previous descriptions may apply. In some embodiment, for instance, audio data may be received from both the initiating device and the recipient device after the communications session has been established. Persons of ordinary skill in the art will further recognize that, although audio data representing sounds is received at step 1108, in one embodiment, no speech data may be received, and in this particular scenario the absence of speech data may indicate that an individual (e.g., an initiator and/or a receiver) is not speaking.

At step 1110, a determination is made as to whether or not the sounds correspond to speech. If, at step 1110, it is determined that the sounds correspond to speech, the process 1110 may proceed to step 1112, where the communications session is allowed to continue. However, if at step 1110 it is determined that the sounds correspond to non-speech (or a lack of speech), then process 1100 may proceed to step 1114. In one embodiment, steps 1110 and 1112 of FIG. 11 may be substantially similar to steps 514 and 516 of FIG. 5, and/or steps 614 and 616 of FIG. 6, and the previous descriptions may apply.

At step 1114, a determination is made as to whether or not an input is currently being, or has recently been, detected by the initiating device and/or the recipient device. For example, media system 216 of electronic devices 100a, 100b may monitor keyboard inputs, mouse inputs/motion, touch inputs detected by display screen 212 (if a touch screen) or track pad, and/or one or more buttons, knobs, or switches of those devices. As an illustrative example, if an individual has been interacting with a touch-sensitive display screen 212, then media system 216 may store that information indicating that the individual has recently been active proximate their electronic device 100. If, at step 1114, it is determined that no inputs have been detected, then process 1100 may proceed to step 1116, where communications system 228 may cause the communications session to end. For instance, since no speech has been detected, and no inputs have been detected, communications system 228 may determine that no one is currently interacting with the initiating and/or recipient device, and therefore the communications session should end. In one embodiment, step 1116 of FIG. 11 may be substantially similar to step 716 of FIG. 7, and the previous description may apply.

If, however, one or more inputs are detected at step 1114, then process 1100 may proceed to step 1118. At step 118, it may be determined that additional audio data representing additional sounds should be received. For instance, an individual may not hear, or otherwise be aware, of the communications session being established, despite the fact that he/she may be interacting with their electronic device (e.g., touching display screen 212). In this particular scenario, the individual may be provided with additional time with which to start speaking, in order to prevent communications system 228 from causing the communications session to end. In some embodiments, after the additional audio data is received, another determination may be made as to whether or not the additional sounds represent speech. For instance, if the additional sounds do represent speech, then the communications session may continue, whereas if the additional sounds do not represent speech, then the communications session may end.

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A method, comprising:
receiving, from an initiating device, a request to initiate a communications session between the initiating device and a recipient device;
establishing the communications session;
receiving first data indicating that first sounds were received by at least one microphone of the initiating device during a first amount of time after the communications session is initiated;
determining that the first sounds correspond to non-speech;
receiving second data indicating that second sounds were received by the at least one microphone during a second amount of time after an end of the first amount of time;
determining that the second sounds correspond to non-speech;
determining a third amount of time between the first amount of time and the second amount of time;
determining that the third amount of time is greater than a threshold amount of time; and
causing the communications session to end based, at least in part, on the first sounds and the second sounds corresponding to non-speech and the third amount of time being greater than the threshold amount of time.

2. The method of claim 1, further comprising:
receiving third data indicating that third sounds were received by the at least one microphone during a fourth amount of time, the fourth amount of time beginning after initiation of an additional communications session between the initiating device and the recipient device;
determining that the third sounds correspond to speech; and
causing the additional communications session to continue.

3. The method of claim 1, further comprising:
receiving, prior to causing the communications session to end, presence information from the initiating device, the presence information indicating that an individual is located proximate to the initiating device; and
causing the communications session to continue based at least in part on the presence information.

4. The method of claim 1, further comprising;
determining, prior to causing the communications session to end, that a mute function of the initiating device has been activated; and
causing the communications session to end further based at least in part on the mute function being activated.

5. A method, comprising:
receiving, from a first device, a request to establish a communications session with at least a second device;
causing the communications session between the first device and at least the second device to be established;
determining, during a first period of time of the communications session, a first absence of speech from the first device;
determining, during a second period of time of the communications session, a second absence of speech from the first device;
determining an amount of time between the first period of time and the second period of time; and
causing, based at least in part on the amount of time, the communications session to end.

6. The method of claim 5, further comprising:
receiving first data indicating that first sounds were received by the first device; and
determining that the first sounds correspond to non-speech.

7. The method of claim 5, further comprising:
determining, prior to causing the communications session to end, a user account associated with the first device;
determining voice biometric data associated with the user account;
receiving audio data representing speech; and
determining, based at least in part on the voice biometric data, that the speech is unassociated with the user account.

8. The method of claim 5, further comprising:
receiving a second request to establish a second communications session with at least the second device;
causing the second communications session between the first device and at least the second device to be established;
determining that, during the second communications session, audio data representing speech was received from the first device; and
causing the second communications session to continue.

9. The method of claim 5, further comprising:
receiving, prior to causing the communications session to end, image data representing at least a portion of a human body part; and
determining a threshold amount of time based at least in part on the image data.

10. The method of claim 5, further comprising:
receiving audio data;
determining an energy level of the audio data; and
determining that the energy level is less than or equal to a predefined energy threshold associated with speech.

11. The method of claim 5, further comprising:
receiving audio data;
generating first text data representing the audio data;
determining second text data representing a message to be uttered in response to the communications session being established; and
determining that the first text data and the second text data differ.

12. The method of claim 5, further comprising:
determining the first device has been authorized to establish communications sessions with the second device without the second device receiving indicators of acceptance of the communications sessions; and
after determining the first device has been authorized, causing the communications session between the first device and at least the second device to be established.

13. A system, comprising:
a first device;
a second device;
at least one processor; and
at least one memory including instructions that, when executed by the at least one processor, cause the system to:
receive, from the first device, a request to establish a communications session with at least the second device;
cause the communications session between the first device and at least the second device to be established;
determine, during a first period of time of the communications session, a first absence of speech associated with the first device;
determine, during a second period of time of the communications session, a second absence of speech from the first device;

determining an amount of time between the first period of time and the second period of time; and cause, based at least in part on the amount of time, the communications session to end.

14. The system of claim 13, wherein the at least one memory further includes instructions that, when executed by the at least one processor, further cause the system to:

receive first data indicating that first sounds were received by the first device; and determine that the first sounds correspond to non-speech.

15. The system of claim 13, wherein the at least one memory further includes instructions that, when executed by the at least one processor, further cause the system to:

determine, prior to causing the communications session to end, a user account associated with the first device;

determine voice biometric data associated with the user account;

receive audio data representing speech; and determine, based at least in part on the voice biometric data, that the speech is unassociated with the user account.

16. The system of claim 13, wherein the at least one memory further includes instructions that, when executed by the at least one processor, further cause the system to:

receive a second request to establish a second communications session with at least the second device;

cause the second communications session between the first device and at least the second device to be established;

determine that, during the second communications session, audio data representing speech was received from the first device; and cause the second communications session to continue.

17. The system of claim 13, wherein the at least one memory further includes instructions that, when executed by the at least one processor, further cause the system to:

receive, prior to causing the communications session to end, first image representing at least a portion of a human body part; and determine a threshold amount of time based at least in part on the image data.

18. The system of claim 13, wherein the at least one memory further includes instructions that, when executed by the at least one processor, further cause the system to:

receive audio data;

determine an energy level of the audio data; and determine that the energy level is less than or equal to predefined energy threshold associated with speech.

19. The system of claim 13, wherein the at least one memory further includes instructions that, when executed by the at least one processor, further cause the system to:

receive audio data;

generate first text data representing the audio data;

determine second text data representing a message to be uttered in response to the communications session being established; and determine that the first text data and the second text data differ.

20. The system of claim 13, wherein the at least one memory further includes instructions that, when executed by the at least one processor, further cause the system to:

determine the first device has been authorized to establish communications sessions with the second device without the second device receiving indicators of acceptance of the communications sessions; and after determining the first device has been authorized, cause the communications session between the first device and at least the second device to be established.

* * * * *